United States Patent
Narumi et al.

(10) Patent No.: US 7,116,623 B2
(45) Date of Patent: Oct. 3, 2006

(54) OPTICAL INFORMATION RECORDING METHOD, OPTICAL INFORMATION RECORDING DEVICE AND OPTICAL INFORMATION RECORDING MEDIUM

(75) Inventors: Kenji Narumi, Ibaraki (JP); Naoyasu Miyagawa, Kawanishi (JP); Kenichi Nishiuchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/532,946

(22) PCT Filed: Oct. 28, 2003

(86) PCT No.: PCT/JP03/13745

§ 371 (c)(1),
(2), (4) Date: Apr. 26, 2005

(87) PCT Pub. No.: WO2004/038705

PCT Pub. Date: May 6, 2004

(65) Prior Publication Data

US 2006/0044968 A1 Mar. 2, 2006

(30) Foreign Application Priority Data

Oct. 28, 2002 (JP) .............................. 2002-312433

(51) Int. Cl.
*G11B 5/09* (2006.01)
*G11B 7/00* (2006.01)

(52) U.S. Cl. .................. 369/59.11; 369/47.51

(58) Field of Classification Search ............ 369/59.11, 369/59.12, 47.5, 47.51, 47.52, 116
See application file for complete search history.

(56) References Cited

U.S. PATENT DOCUMENTS

| 5,412,626 | A | | 5/1995 | Ohno et al. | |
|---|---|---|---|---|---|
| 5,848,043 | A | | 12/1998 | Takada et al. | |
| 5,956,308 | A | * | 9/1999 | Akahira et al. | ......... 369/53.29 |
| 6,459,666 | B1 | | 10/2002 | Yokoi | |

(Continued)

FOREIGN PATENT DOCUMENTS

JP 9-282661 10/1997

(Continued)

*Primary Examiner*—Thang V. Tran
(74) *Attorney, Agent, or Firm*—Hamre, Schumann, Mueller & Larson, P.C.

(57) ABSTRACT

An optical information recording device includes a linear velocity setting circuit for setting a first linear velocity v1 and a second linear velocity v2 higher than the first linear velocity v1 for a optical information recording medium, a recording pulse generation circuit for generating a recording pulse signal, depending on the setting by the linear velocity setting circuit, and a laser drive circuit for irradiating the medium with the laser light based on the recording pulse signal generated by the recording pulse generation circuit. The laser drive circuit controls a power level of the laser light so that Pbt1≦Pe1 and Pe2<Pbt2≦Pwa2, where Pbt1 represents a first inter-pulse power level indicating a power level between recording pulses for the first linear velocity v1, Pbt2 represents a second inter-pulse power level indicating a power level between the recording pulses for the second linear velocity v2, Pwa2 represents a recording power level indicating a power level of the recording power for the second linear velocity v2, Pe1 represents a first erase power level indicating a power level of the erase power for the first linear velocity v1, and Pe2 represents a second erase power level indicating a power level of the erase power for the second linear velocity v2.

28 Claims, 18 Drawing Sheets

U.S. PATENT DOCUMENTS

| | | |
|---|---|---|
| 6,631,109 B1 * | 10/2003 | Nakamura ............... 369/59.11 |
| 6,704,269 B1 | 3/2004 | Ogawa |
| 2001/0017833 A1 | 8/2001 | Yamada et al. |
| 2003/0123352 A1 * | 7/2003 | Chen ....................... 369/47.53 |
| 2004/0052176 A1 * | 3/2004 | Narumi et al. ........... 369/59.11 |
| 2004/0053076 A1 * | 3/2004 | Kosuda et al. ........... 369/13.35 |
| 2005/0013229 A1 * | 1/2005 | Yokoi ..................... 369/59.12 |

FOREIGN PATENT DOCUMENTS

| | | |
|---|---|---|
| JP | 2000-11382 | 1/2000 |
| JP | 2001-118245 | 4/2001 |
| JP | 2001-155339 | 6/2001 |
| JP | 2001-222819 | 8/2001 |
| JP | 2003-203340 | 7/2003 |

* cited by examiner

OPTICAL INFORMATION RECORDING METHOD, OPTICAL INFORMATION RECORDING DEVICE AND OPTICAL INFORMATION RECORDING MEDIUM

TECHNICAL FIELD

The present invention relates to a recording/reproduction method and a recording/reproduction device for recording/reproducing data onto/from an optical information recording medium. More particularly, the present invention relates to a method for generating a recording pulse waveform for a medium on which recording is performed using a plurality of different linear velocities.

BACKGROUND ART

Recently, optical discs, optical cards, optical tapes and the like have been proposed and developed as media for recording data optically. Among them, the optical disc has attracted attention as a medium capable of recording/reproducing data with large capacity and high density.

For example, in the case of a phase change optical disc, recording/reproduction of data is performed using a method that is described in the following. A recording layer of an optical disc is irradiated with laser light (this power level is referred to as a recording power level and is represented by Pw) that is focused using an optical head and is stronger than a reproduction power, to cause the temperature of the recording layer to rise and exceed the melting point. After the laser light goes through, a melted portion is cooled rapidly to form a mark in an amorphous state. Alternatively, the recording layer is irradiated with focused laser light that causes the temperature thereof to rise up to the crystallization temperature or more and the melting point or less (this power level is referred to as an erase power level, which is represented by Pe) so that an irradiated portion of the recording layer is changed into a crystallized state.

In this manner, a recording pattern including a mark that is an amorphous region and a space that is a crystalline region is formed on a medium, corresponding to a data signal. Data is reproduced by utilizing a difference in reflectance between the crystalline and amorphous regions.

As described above, in order to form a mark on a medium, laser light needs to be modulated and emitted so that the power level thereof is between the erase power level and the recording power level. A pulse waveform used for this modulation is referred to as a recording pulse. A number of recording methods for forming one mark using a plurality of recording pulses is known. The plurality of recording pulses are referred to as a recording pulse sequence.

At present, CLV (constant linear velocity) recording mainly is used for optical information recording media, such as recording DVD and the like. This is a recording technique in which a linear velocity, a transfer rate and a linear density are substantially constant over the entire surface of a medium. In this case, the rotational speed of a medium varies depending on the recording/reproduction position (i.e., radial position) on the medium.

In contrast to this, a CAV (constant angular velocity) recording technique has been proposed in which the rotational speed and linear density of a medium are substantially constant on the entire surface of the medium. In the CAV recording technique, it is not necessary to control the rotational speed of a spindle motor that rotates a medium. Therefore, the spindle motor and its control circuit advantageously can be produced with low cost. In addition, it is not necessary to suspend recording/reproduction until a predetermined rotational speed is attained after seeking of a recording/reproduction position, whereby the speed of access to a medium can be improved.

On the other hand, in this technique, the linear velocity and the transfer rate vary depending on the recording/reproduction position on a medium. Therefore, conditions for laser light irradiation and heating/cooling vary depending on the recording/reproduction position on a medium.

Various recording techniques are known for improving signal quality when a plurality of different linear velocities are used to record a medium. One of them is a method of forming a mark in which a recording pulse sequence is used in a manner that the ratio of a recording power with respect to an erase power is changed or the width of each recording pulse is changed, depending on the recording linear velocity, as disclosed in, e.g., Patent Publication 1 (JP 2001-118245A (pages 5–7, FIG. 1)). Also, a method of forming a mark using a recording pulse sequence in which the duty ratio of each recording pulse is increased, depending on an increase in the recording linear velocity (i.e., increasing the ratio of a pulse width to a channel clock cycle) is disclosed in, e.g., Patent Publication 2 (JP 2001-222819A (pages 3–5, FIG. 2)). Further, a method of forming one recording mark using a recording pulse composed of one rectangular wave in which recording power or a recording pulse width is changed, depending on a recording linear velocity, is disclosed in, e.g., Patent Publication 3 (JP 2001-155339A (pages 5–7, FIG. 2)).

However, the above-described conventional recording/reproduction method has a problem in that data cannot be recorded with high signal quality and stability when the range of changing the linear velocity is large. Hereinafter, the problem will be described.

When a recording pulse sequence is used for recording at a high linear velocity and a high transfer rate, a short channel clock cycle is required that is used as a reference for generation of the recording pulse sequence. However, there are certain rising and falling times for laser modulation and emission requirements.

FIG. 16 is a diagram showing waveforms of signals for modulating laser light to record a mark, and a waveform of laser light in a conventional recording/reproduction method. For example, as shown in FIG. 16, when ½ of a cycle Tw91 of a channel clock signal is longer than the sum of a rising time TU1 and a falling time TD1 of laser light, the laser light can be modulated and emitted between each of a recording power level Pw, an erase power level Pe and an inter-pulse power level Pbt.

FIG. 17 is a diagram showing other waveforms of signals for modulating laser light to record a mark, and another waveform of laser light in a conventional recording/reproduction method. As shown in FIG. 17, when ½ of a cycle Tw92 of a channel clock signal is shorter than the sum of a rising time TU2 and a falling time TD2 of laser light, the laser light cannot be modulated between a recording power level Pw and an inter-pulse power level Pbt, so the power level of the laser light varies depending on the pulse width of the emitted light. In other words, since the power level is unstable during modulation, a mark having a desired shape cannot be formed stably.

FIG. 18 is a diagram showing still other waveforms of signals for modulating laser light to record a mark, and still another waveform of laser light in a conventional recording/reproduction method. The method of increasing the duty ratio of each recording pulse, depending on an increase in the linear velocity, has the following problem when the linear velocity is high. Specifically, even when ½ of a cycle Tw93 of a channel clock signal is longer than the sum of the rising time and the falling time of the laser light, if a width between each pulse is shorter than the sum of the rising time and the falling time of laser, the laser light no longer can be modulated between a recording power level Pw and an inter-pulse power level Pbt as shown in FIG. 18.

FIG. 19 is a diagram showing still other waveforms of signals for modulating laser light to record a mark, and still another waveform of laser light in a conventional recording/ reproduction method. When a single rectangular wave is used for recording at a low linear velocity and a low transfer rate, the relative velocity between a laser spot and a medium is slow and the width of a recording pulse is long. As a result, a heat accumulation effect is large with respect to a medium, and therefore, mark distortion is likely to occur.

For example, when a mark is formed onto a phase change optical disc, heat accumulated in a front portion of a mark diffuses into a rear portion of the mark while the rear portion of the mark is being recorded. As a result, a larger amount of heat is supplied to the rear portion of the mark than the front portion of the mark on the recording layer. Therefore, as shown in FIG. 19, there occurs a phenomenon in which a mark 702 formed on a track 701 of a phase change optical disc has a rear portion larger than a front portion of the mark 702 so that the shape of the mark 702 is distorted, resulting in a deteriorated quality of a reproduced signal.

Further, the duty ratio of a recording pulse signal is changed along the direction of a time axis with respect to the waveform of emitted light by, typically, delaying a recording pulse signal using a delay line or the like. Therefore, a change along the time axis is discrete. Therefore, in the CAV recording technique, the duty ratio can be changed only discretely, while the linear velocity changes continuously. As a result, recording characteristics vary depending on a recording position in the CAV recording technique.

An object of the present invention is to provide an optical information recording method, an optical information recording device and an optical information recording medium that can record/reproduce data onto/from the same medium over a wide linear velocity range with stability and high signal quality.

[Patent Document 1]
JP 2001-118245A (pages 5–7, FIG. 1)
[Patent Document 2]
JP 2001-222819A (pages 3–5, FIG. 2)
[Patent Document 3]
JP 2001-155339A (pages 5–7, FIG. 2)

DISCLOSURE OF INVENTION

In an optical information recording device according to the present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The device includes a linear velocity setting circuit for setting a first linear velocity v1 and a second linear velocity v2 that is higher than the first linear velocity v1 for the rotating optical information recording medium; a recording pulse generation circuit for generating a recording pulse signal, depending on a result of setting by the linear velocity setting circuit; and a laser drive circuit for irradiating the optical information recording medium with the laser light based on the recording pulse signal generated by the recording pulse generation circuit. The laser drive circuit controls a power level of the laser light in such a manner that $Pbt1 \leq Pe1$ and $Pe2 < Pbt2 \leq Pwa2$ is satisfied, where $Pbt1$ represents a first inter-pulse power level indicating a power level between recording pulses for the first linear velocity v1, $Pbt2$ represents a second inter-pulse power level indicating a power level between the recording pulses for the second linear velocity v2, $Pwa2$ represents a recording power level indicating a power level of the recording power for the second linear velocity v2, $Pe1$ represents a first erase power level indicating a power level of the erase power for the first linear velocity v1, and $Pe2$ represents a second erase power level indicating a power level of the erase power for the second linear velocity v2.

In another optical information recording device according to present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The device includes a linear velocity setting circuit for setting a first linear velocity v1 and a second linear velocity v2 that is higher than the first linear velocity v1 for the rotating optical information recording medium; a recording pulse generation circuit for generating a recording pulse signal, depending on a result of setting by the linear velocity setting circuit; and a laser drive circuit for irradiating the optical information recording medium with the laser light based on the recording pulse signal generated by the recording pulse generation circuit. The laser drive circuit controls a power level of the laser light in such a manner that $Pbt1 \leq Pe1$ and $Pe2 < Pwb2 < Pwa2$ is satisfied, and a waveform of the laser light for the second linear velocity v2 is set to be a stepwise waveform such that a recording pulse of the power level $Pwb2$ is provided immediately after a recording pulse of the power level $Pwa2$, where $Pbt1$ represents a first inter-pulse power level indicating a power level between recording pulses for the first linear velocity v1, $Pwa2$ represents a recording power indicating a power level of the recording power for the second linear velocity v2, $Pwb2$ represents a second recording power indicating a power level of a second recording power for the second linear velocity v2, $Pe1$ represents a first erase power level indicating a power level of the erase power for the first linear velocity v1, and $Pe2$ represents a second erase power level indicating a power level of the erase power for the second linear velocity v2.

In still another optical information recording device according to the present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The device includes a linear velocity setting circuit for setting a first linear velocity v1, which is a lower limit, and a second linear velocity v2, which is an upper limit, with respect to the rotating optical information recording medium, a recording pulse generation circuit for generating a recording pulse signal, depending on a result of setting by the linear velocity setting circuit, and a laser drive circuit for irradiating the optical information recording medium with the laser light based on the recording pulse signal generated by the recording pulse generation circuit. $Pbt1 \leq Pe1$ and $Pe2<Pwb2<Pwa2$ are satisfied, the laser light is irradiated while switching powers among the recording power level, the first erase power level and the first inter-pulse power level, when the linear velocity v is $v1<v<v0$, a waveform of the laser light is set to be a stepwise waveform such that a recording pulse of the power level Pwb2 is provided immediately after a recording pulse of the power level Pwa2, when the linear velocity v is $v0<v<v2$, and the power level Pwb of the second recording power is controlled so that (Pwb−Pe) is increased, depending on an increase in the linear velocity v. Pbt1 represents a first inter-pulse power level indicating a power level between recording pulses for the first linear velocity v1, Pwa2 represents a recording power indicating a power level of the recording power for the second linear velocity v2, Pwb2 represents a second recording power indicating a power level of a second recording power for the second linear velocity v2, Pe1 represents a first erase power level indicating a power level of the erase power for the first linear velocity v1, Pe2 represents a second erase power level indicating a power level of the erase power for the second linear velocity v2, $v1<v0<v2$ is satisfied, Pwb represents a power level of the second recording power for a linear velocity v of $v1<v<v2$, and Pe represents a power level of the erase power for the linear velocity v.

In still another optical information recording device according to the present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The device includes a linear velocity setting circuit for setting a first linear velocity v1, which is a lower limit, and a second linear velocity v2, which is an upper limit, with respect to the rotating optical information recording medium, a recording pulse generation circuit for generating a recording pulse signal, depending on a result of setting by the linear velocity setting circuit, and a laser drive circuit for irradiating the optical information recording medium with the laser light based on the recording pulse signal generated by the recording pulse generation circuit. Duty ratios of the recording pulses are set to be constant when the linear velocity v is $v1 \leq v<v0$ and when the linear velocity v is $v0<v \leq v2$, respectively, and the power level Pbt of the inter-pulse is controlled so that (Pbt−Pe) is increased, depending on an increase in the linear velocity v, when the linear velocity v is $v1 \leq v<v0$ and when the linear velocity v is $v0<v \leq v2$, respectively, where Pbt represents a power level between the recording pulses for a linear velocity v of $v1<v<v2$, Pe represents a power level of the erase power for the linear velocity v, and $v1<v0<v2$.

In an optical information recording method according to the present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The method includes a linear velocity setting step of setting a first linear velocity v1 and a second linear velocity v2 that is higher than the first linear velocity v1 for the rotating optical information recording medium, a recording pulse generation step of generating a recording pulse signal, depending on a result of setting by the linear velocity setting step, and a laser drive step of irradiating the optical information recording medium with the laser light based on the recording pulse signal generated by the recording pulse generation step. In a laser drive step, a power level of the laser light is controlled in such a manner that $Pbt1 \leq Pe1$ and $Pe2<Pbt2 \leq Pwa2$ is satisfied, where Pbt1 represents a first inter-pulse power level indicating a power level between recording pulses for the first linear velocity v1, Pbt2 represents a second inter-pulse power level indicating a power level between the recording pulses for the second linear velocity v2, Pwa2 represents a recording power level indicating a power level of the recording power for the second linear velocity v2, Pe1 represents a first erase power level indicating a power level of the erase power for the first linear velocity v1, and Pe2 represents a second erase power level indicating a power level of the erase power for the second linear velocity v2.

In another optical information recording method according to the present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The method includes a linear velocity setting step of setting a first linear velocity v1 and a second linear velocity v2 that is higher than the first linear velocity v1 for the rotating optical information recording medium, a recording pulse generation step of generating a recording pulse signal, depending on a result of setting by the linear velocity setting step, and a laser drive step of irradiating the optical information recording medium with the laser light based on the recording pulse signal generated by the recording pulse generation step. In the laser drive step, a power level of the laser light is controlled in such a manner that $Pbt1 \leq Pe1$ and $Pe2<Pwb2<Pwa2$ is satisfied, and a waveform of the laser light for the second linear velocity v2 is caused to be a stepwise waveform such that a recording pulse of the power level Pwb2 is provided immediately after a recording pulse of the power level Pwa2, where Pbt1 represents a first inter-pulse power level indicating a power level between recording pulses for the first linear velocity v1, Pwa2 represents a recording power indicating a power level of the recording power for the second linear velocity v2, Pwb2 represents a second recording power indicating a power level of a second recording power for the second linear velocity v2, Pe1 represents a first erase power level indicating a power level of the erase power for the first linear velocity v1, and Pe2 represents a second erase power level indicating a power level of the erase power for the second linear velocity v2.

In still another optical information recording method according to the present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The method includes a linear velocity setting step of setting a first linear velocity v1, which is a lower limit, and a second linear velocity v2, which is an upper limit, with respect to the rotating optical information recording medium, a recording pulse generation step of generating a recording pulse signal, depending on a result of setting by the linear velocity setting circuit, and a laser drive step of irradiating the optical information recording medium with the laser light based on the recording pulse signal generated by the recording pulse generation circuit. Pbt1≦Pe1 and Pe2<Pwb2<Pwa2 are satisfied, the laser light is emitted while switching powers among the recording power level, the first erase power level and the first inter-pulse power level, when the linear velocity v is v1<v<v0, a waveform of the laser light is caused to be a stepwise waveform such that a recording pulse of the power level Pwb2 is provided immediately after a recording pulse of the power level Pwa2, when the linear velocity v is v0<v<v2, and the power level Pwb of the second recording power is controlled so that (Pwb−Pe) is increased, depending on an increase in the linear velocity v. Pbt1 represents a first inter-pulse power level indicating a power level between recording pulses for the first linear velocity v1, Pwa2 represents a recording power indicating a power level of the recording power for the second linear velocity v2, Pwb2 represents a second recording power indicating a power level of a second recording power for the second linear velocity v2, Pe1 represents a first erase power level indicating a power level of the erase power for the first linear velocity v1, Pe2 represents a second erase power level indicating a power level of the erase power for the second linear velocity v2, v1<v0<v2, Pwb represents a power level of the second recording power for a linear velocity v of v1<v<v2, and Pe represents a power level of the erase power for the linear velocity v.

In still another optical information recording method according to the present invention, a mark or a space having a length corresponding to a length of a data recording code is formed by irradiating a rotating optical information recording medium with laser light to change optical characteristics of a photosensitive recording layer, and the mark is formed by irradiation of the laser light with a power being switched among a plurality of power levels including at least a recording power level and an erase power level. The method includes a linear velocity setting step of setting a first linear velocity v1, which is a lower limit, and a second linear velocity v2, which is an upper limit, with respect to the rotating optical information recording medium, a recording pulse generation step of generating a recording pulse signal, depending on a result of setting by the linear velocity setting circuit, and a laser drive step of irradiating the optical information recording medium with the laser light based on the recording pulse signal generated by the recording pulse generation circuit. Duty ratios of the recording pulses are set to be constant when the linear velocity v is v1≦v<v0 and when the linear velocity v is v0<v≦v2, respectively, and the power level Pbt of the inter-pulse is controlled so that (Pbt−Pe) is increased, depending on an increase in the linear velocity v, when the linear velocity v is v1≦v<v0 and when the linear velocity v is v0<v≦v2, respectively, where Pbt represents a power level between the recording pulses for a linear velocity v of v1<v<v2, Pe represents a power level of the erase power for the linear velocity v, and v1<v0<v2 is satisfied.

An optical information recording medium according to the present invention, which is to be used for recording data by the optical information recording method of the present invention, includes information recorded thereon that indicates values of the first inter-pulse power level Pbt1 and the second inter-pulse power level Pbt2 is recorded on the optical information recording medium.

Another optical information recording medium according to the present invention, which is to be used for recording data by the optical information recording method of the present invention, includes information recorded thereon that indicates values of the first inter-pulse power level Pbt1 and the second recording power level Pwb2 recorded on the optical information recording medium.

Still another optical information recording medium according to the present invention, which is to be used for recording data by the optical information recording method of the present invention, includes information recorded thereon that indicates a value of the second recording power level Pwb2 is recorded on the optical information recording medium.

Still another optical information recording medium according to the present invention, which is to be used for recording data by the optical information recording method of the present invention, includes information recorded thereon that indicates a value of the first inter-pulse power level Pbt1 is recorded on the optical information recording medium.

Still another optical information recording medium according to the present invention, which is to be used for recording data by the optical information recording method of the present invention, includes information recorded thereon that indicates values of the inter-pulse power level Pbt and the duty ratio of the recording pulse is recorded on the optical information recording medium.

Still another optical information recording medium according to the present invention, which is to be used for recording data by the optical information recording method of the present invention, includes information recorded thereon that indicates a value of a correction amount of an edge position of the recording pulse is recorded on the optical information recording medium.

BEST MODE FOR CARRYING OUT THE INVENTION

Figure 1:
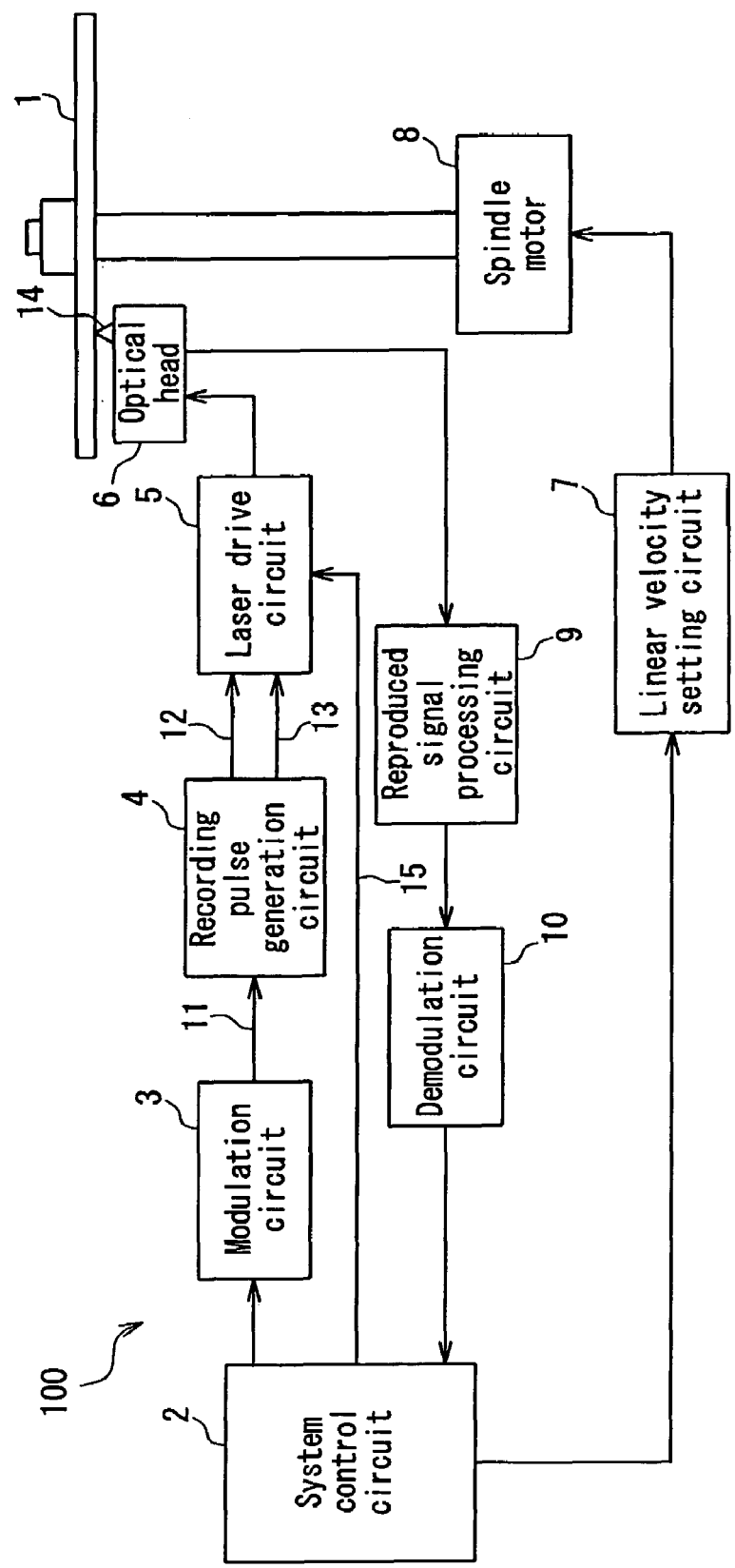
FIG. 1 is a block diagram showing an schematic structure of an optical information recording device according to Embodiment 1 of the present invention.

In an optical information recording device according to an embodiment of the present invention, the laser drive circuit controls a power level of the laser light in such a manner that $Pbt1 \leq Pe1$ and $Pe2 < Pbt2 \leq Pwa2$ is satisfied, where $Pbt1$ represents a first inter-pulse power level indicating a power level between recording pulses for the first linear velocity $v1$, $Pbt2$ represents a second inter-pulse power level indicating a power level between the recording pulses for the second linear velocity $v2$, $Pwa2$ represents a recording power level indicating a power level of the recording power for the second linear velocity $v2$, $Pe1$ represents a first erase power level indicating a power level of the erase power for the first linear velocity $v1$, and $Pe2$ represents a second erase power level indicating a power level of the erase power for the second linear velocity $v2$.

Therefore, the inter-pulse power level $Pbt1$ for a low linear velocity and the inter-pulse power level $Pbt2$ for a high linear velocity can be set to be different from each other. In addition, when an erase power for each linear velocity is used as a reference, the inter-pulse power $Pbt1$ can be set to be lower than the erase power $Pe1$ for a low linear velocity, while the inter-pulse power $Pbt2$ can be set to be higher than the erase power $Pe2$ for a high linear velocity. As a result, it is possible to form a mark without distortion over a wide linear velocity range, thereby allowing accurate data recording.

Preferably, the laser drive circuit controls the second inter-pulse power level $Pbt2$ to be $Pbt2=Pwa2$, and controls a waveform of the recording pulse to be a rectangular wave.

Preferably, the laser drive circuit controls the inter-pulse power level $Pbt$ so that $(Pbt-Pe)$ is increased between $Pbt1$ and $Pbt2$, depending on an increase in the linear velocity $v$, where $Pbt$ represents a power level between the recording pulses for a linear velocity $v$ of $v1 < v < v2$, and $Pe$ represents a power level of the erase power for the linear velocity $v$.

Preferably, a waveform of the recording pulse is a rectangular wave for a predetermined linear velocity of $v0$ or more, $v0$ having a relationship $v1 < v0 < v2$.

An optical information recording device according to an embodiment of the present invention forms a mark or a space having a length corresponding to the length of a data recording code by irradiating a rotating optical information recording medium with laser light to change optical characteristics of a photosensitive recording layer. The mark is formed by irradiation of the laser light with a power being switched among a plurality of power levels including at least a recording power level and an erase power level. The device includes a linear velocity setting circuit for setting the first linear velocity $v1$ and the second linear velocity $v2$ that is higher than the first linear velocity $v1$ for the rotating optical information recording medium, a recording pulse generation circuit for generating a recording pulse signal, depending on a result of setting by the linear velocity setting circuit, and a laser drive circuit for irradiating the optical information recording medium with the laser light based on the recording pulse signal generated by the recording pulse generation circuit. The laser drive circuit controls a power level of laser light in such a manner that $Pe1 \leq Pbt1$, $Pe2 < Pbt2 \leq Pwa2$ and $(Pbt1-Pe1)/(Pwa1-Pe1) < (Pbt2-Pe2)/(Pwa2-pe2)$ are satisfied, where $Pbt1$ represents a first inter-pulse power level indicating the power level between the recording pulses for the first linear velocity $v1$, $Pbt2$ represents a second inter-pulse power level indicating the power level between the recording pulses for the second linear velocity $v2$, $Pwa2$ represents a recording power level indicating the power level of the recording power for the second linear velocity $v2$, $Pe1$ represents a first erase power level indicating the power level of the erase power for the first linear velocity $v1$, and $Pe2$ represents a second erase power level indicating the power level of the erase power for the second linear velocity $v2$.

Hereinafter, embodiments of the present invention will be described with reference to the accompanying drawings.

(Embodiment 1)

FIG. 1 is a block diagram showing a schematic structure of an optical information recording device 100 according to Embodiment 1 of the present invention.

Reference numeral 1 indicates an optical disc onto/from which data is recorded/reproduced. Reference numeral 2 indicates a system control circuit that controls the whole optical information recording device 100. Reference numeral 3 indicates a modulation circuit that generates a binary recording data signal corresponding to data to be recorded. Reference numeral 4 indicates a recording pulse generation circuit that generates a pulse for driving a laser, depending on the recording data signal. Reference numeral 5 indicates a laser drive circuit that modulates a current for driving a laser in an optical head 6, depending on the pulse output by the recording pulse generation circuit. Reference numeral 6 indicates an optical head that focuses laser light to irradiate the optical disc 1. Reference numeral 7 indicates a linear velocity setting circuit that controls a linear velocity (i.e., rotational speed) of the optical disc 1. Reference numeral 8 indicates a spindle motor that rotates the optical disc 1. Reference numeral 9 indicates a reproduced signal processing circuit that processes a waveform of a reproduced signal based on light reflected from the optical disc 1. Reference numeral 10 indicates a demodulation circuit for obtaining reproduced data.

Next, operations of the optical information recording device 100 of Embodiment 1 will be described with reference to a flowchart of FIG. 2 and operation diagrams of FIGS. 3 and 4.

Figure 2:
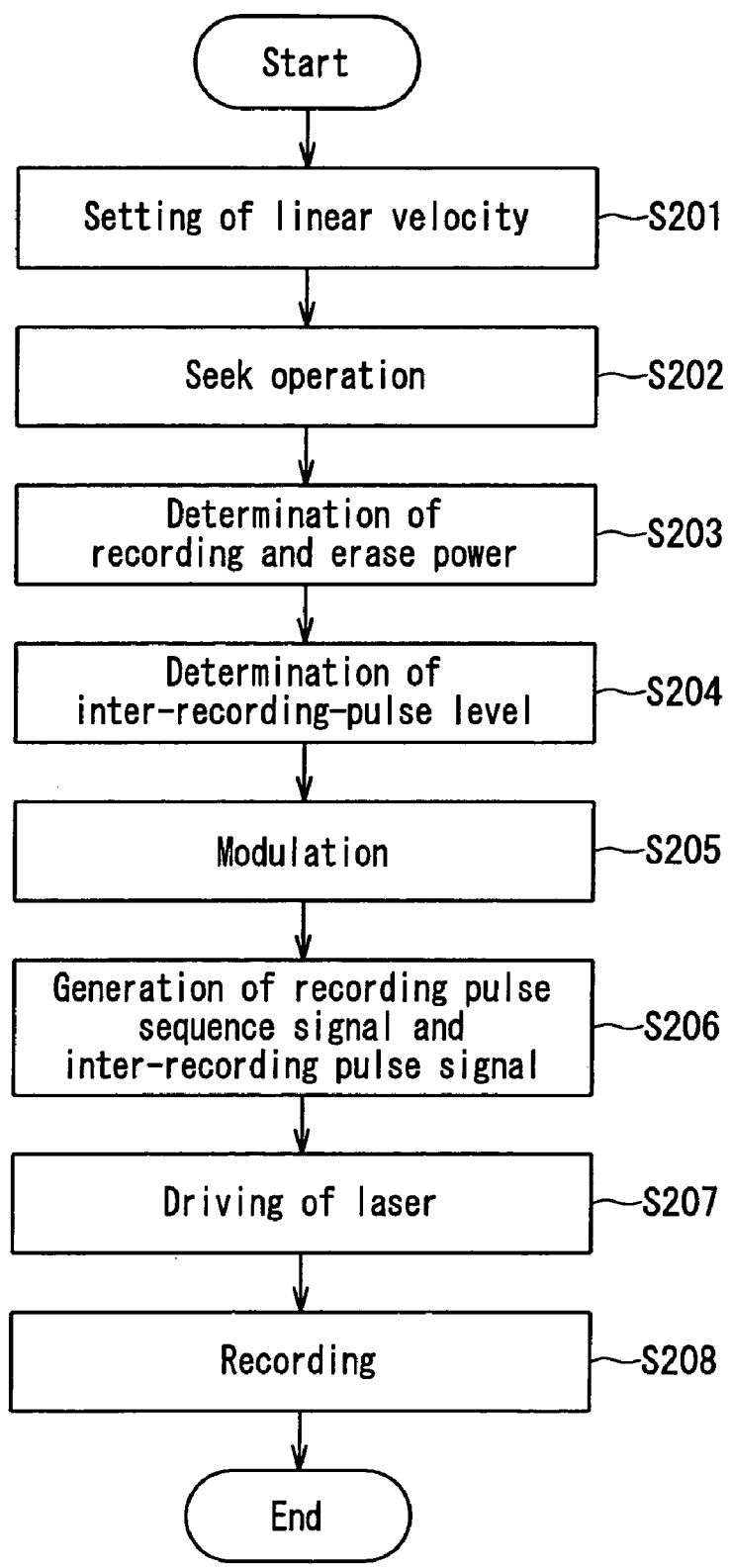
FIG. 2 is a flowchart showing an operation of the optical information recording device of Embodiment 1.

FIG. 2 is a flowchart showing the operation of the optical information recording device 100 of Embodiment 1. FIG. 3 is a waveform diagram showing an operation of the optical information recording device 100 of Embodiment 1 when recording is performed at a low linear velocity. FIG. 4 is a waveform diagram showing an operation thereof when recording is performed at a high linear velocity. FIGS. 3 and 4 show an operation of recording a mark having a code length of 5T. As used herein, T represents a channel clock cycle. In Embodiment 1, a recording pulse signal 12 composed of a total of three recording pulses is used to record a mark having a code length of 5T. A mark having a code length other than 5T is recorded using a different number of recording pulses or/and a recording pulse sequence having a different whole length, depending on an increase or a decrease in the code length.

Figure 3:
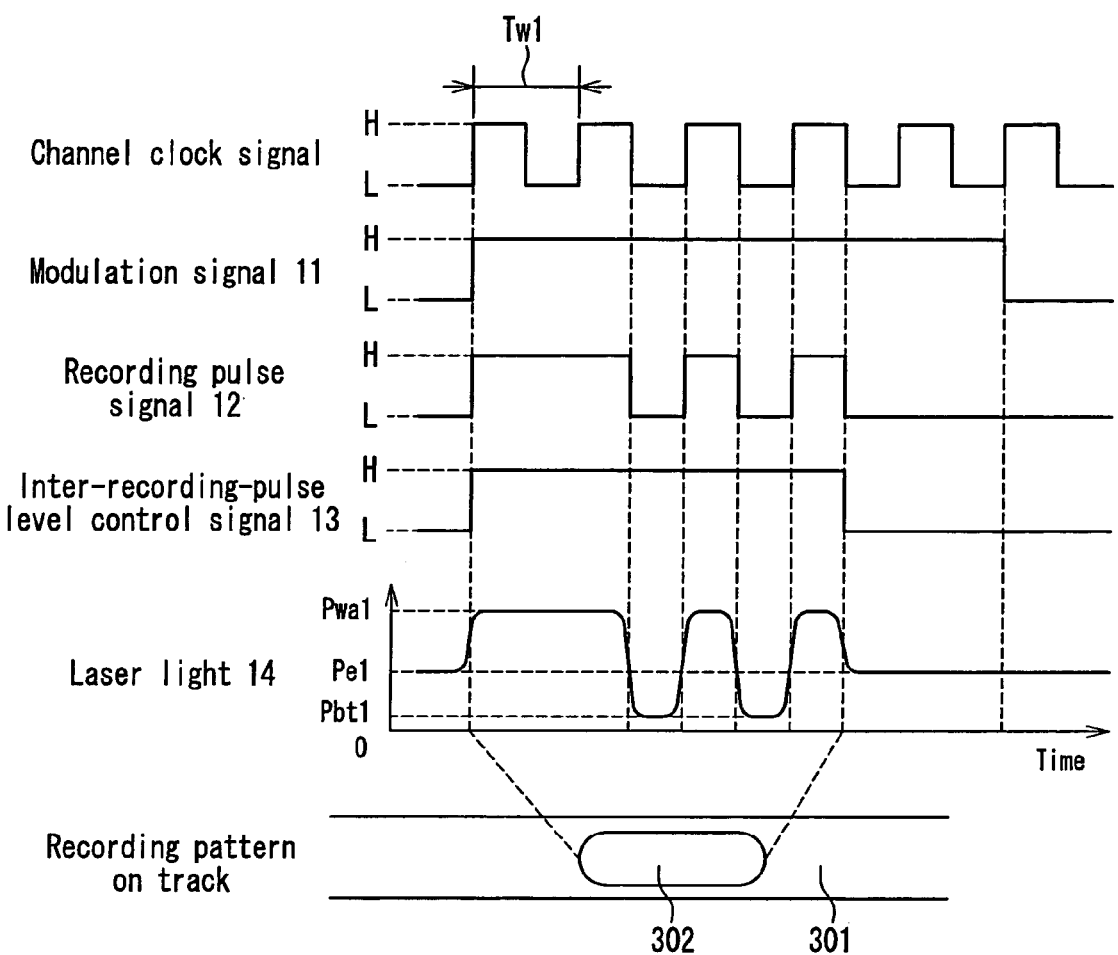
FIGS. 3 and 4 are signal waveform diagrams for explaining an operation of the optical information recording device of Embodiment 1.
Figure 4:
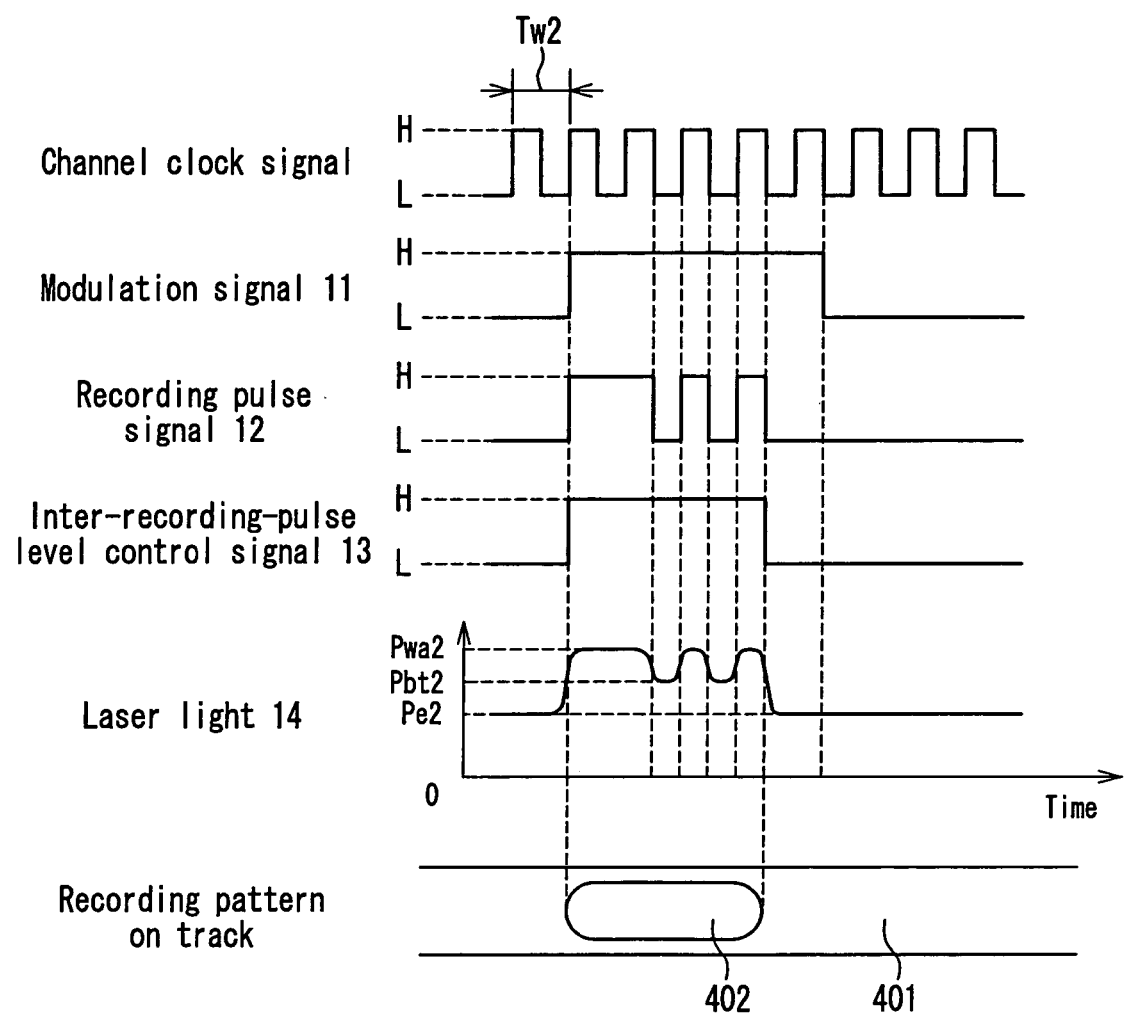

FIGS. 3 and 4 show a waveform of a channel clock signal, a waveform of a modulation signal 11, a waveform of the recording pulse signal 12, a waveform of an inter-pulse level control signal 13, a light emission waveform of laser light 14, and states of respective tracks 301 and 401 after respective marks 302 and 402 are recorded by the laser light 14.

For recording, initially, in a linear velocity setting step STEP201 (hereinafter abbreviated such as S201), the linear velocity setting circuit 7 controls the rotational speed of the spindle motor 8 in accordance with an instruction from the system control circuit 2 to rotate the optical disc 1 at a predetermined linear velocity. Thereafter, in a seek operation step S202, the optical head 6 seeks a predetermined recording area on the optical disc 1.

Next, an operation of recording at the low linear velocity (i.e., recording with a low transfer rate) in Embodiment 1, particularly an operation of recording data, will be described.

In a recording and erase power determination step S203, the system control circuit 2 determines an optimum recording power level Pwa1 and erase power level Pe1 for this low linear velocity and outputs a power setting signal 15 to the laser drive circuit 5. The recording power level Pwa1 and the erase power level Pe1 may be determined by performing test recording on the optical disc 1. Alternatively, when information that indicates the recording power level Pwa1 and the erase power level Pe1 previously are recorded in a control track area of the optical disc 1, the recording power level Pwa1 and the erase power level Pe1 may be determined by reading the information.

Similar to S203, in an inter-pulse level determination step S204, the system control circuit 2 determines a interpulse power level Pbt1 for the low linear velocity and outputs the power setting signal 15 to the laser drive circuit 5. Here, in the case of the low linear velocity, the inter-pulse power level Pbt1 is set to be lower than the erase power level Pe1.

Thereafter, in a modulation step S205, recording data from the system control circuit 2 is modulated by the modulation circuit 3 based on the channel clock signal of FIG. 3. The modulation circuit 3 outputs the modulation signal 11 of FIG. 3. Next, in a recording pulse sequence signal and inter-pulse signal generation step S206, the recording pulse generation circuit 4 outputs the recording pulse signal 12 and the inter-pulse level control signal 13 as shown in FIG. 3 to the laser drive circuit 5 based on the modulation signal 11 output from the modulation circuit 3.

Thereafter, in a laser drive step S207, the laser drive circuit 5 modulates a power level of the laser light 14. This power level is determined based on signal levels of the recording pulse signal 12 and the inter-pulse level control signal 13. Specifically, the power level of the laser light 14 is set to be the recording power level Pwa1 when the recording pulse signal 12 is "H", set to be the inter-pulse power level Pbt1 when the recording pulse signal 12 is "L" and the inter-pulse level control signal 13 is "H", and set to be the erase power level Pe1 when the recording pulse signal 12 is "L" and the inter-pulse level control signal 13 is "L". As a result, the light emission waveform of the laser light 14 has a power level that varies as shown in FIG. 3.

Thereafter, in a recording step S208, the laser light 14 forms the mark 302 corresponding to the code length 5T on the recording track 301 as shown in FIG. 3.

In the case of the low linear velocity, a cycle Tw1 of the channel clock signal is longer than the rising time and the falling time of laser light, and therefore, the laser light 14 stably can perform modulation and light emission between each of the recording power level Pwa1, the erase power level Pe1 and the inter-pulse power level Pbt1. Therefore, the inter-pulse power level Pbt1 can be set to be lower than or equal to the erase power level Pe1, so that the amount of heat when a rear portion of the mark 302 is being recorded can be equal to that of a front portion of the mark 302. As a result, the mark 302 can be formed without distortion, thereby making it possible to record data accurately.

Also, when recording is performed at the high linear velocity in Embodiment 1 (i.e., recording with a high transfer rate), a signal waveform of each section of the device and a recording pattern on a track are as shown in FIG. 4.

A difference from the above-described recording at the low linear velocity is that, in the inter-pulse level determination step S204, the inter-pulse power level Pbt2 is set to be higher than the erase power level Pe2. Thereby, a temperature of the recording layer can be increased sufficiently for the high linear velocity that otherwise causes small heat accumulation. On the other hand, a modulation range of a power level of the laser light 14 is relatively narrow compared with that when recording is performed at the low linear velocity, and therefore, a rising time and a falling time between each power level are also short. In addition, the inter-pulse width can be prevented from being extremely small, and therefore, even in the case of the high linear velocity, laser light can be modulated stably and emitted between each power level.

As described above, an essence of Embodiment 1 is that the inter-pulse power level Pbt1 for the low linear velocity is different from the inter-pulse power level Pbt2 for the high linear velocity, as shown in the relationship between FIG. 3 and FIG. 4. In addition, when the erase power levels Pe1 and Pe2 are used as references for respective linear velocities, the inter-pulse power level Pbt1 is set to be lower than or equal to the erase power level Pe1 for the low linear velocity, while the inter-pulse power level Pbt2 is set to be higher than the erase power level Pe2 for the high linear velocity. Thereby, it is possible to form a mark without distortion over a wide linear velocity range, so that data can be recorded accurately.

(Embodiment 2)

Next, an operation of an optical information recording device according to Embodiment 2 of the present invention will be described with a flowchart of FIG. 5 and operation diagrams of FIGS. 6 and 7.

A structure of the optical information recording device of Embodiment 2 and an operation thereof when recording is performed at a low linear velocity are similar to those described in Embodiment 1. An operation thereof when recording is performed at a high linear velocity hereinafter will be described.

Figure 5:
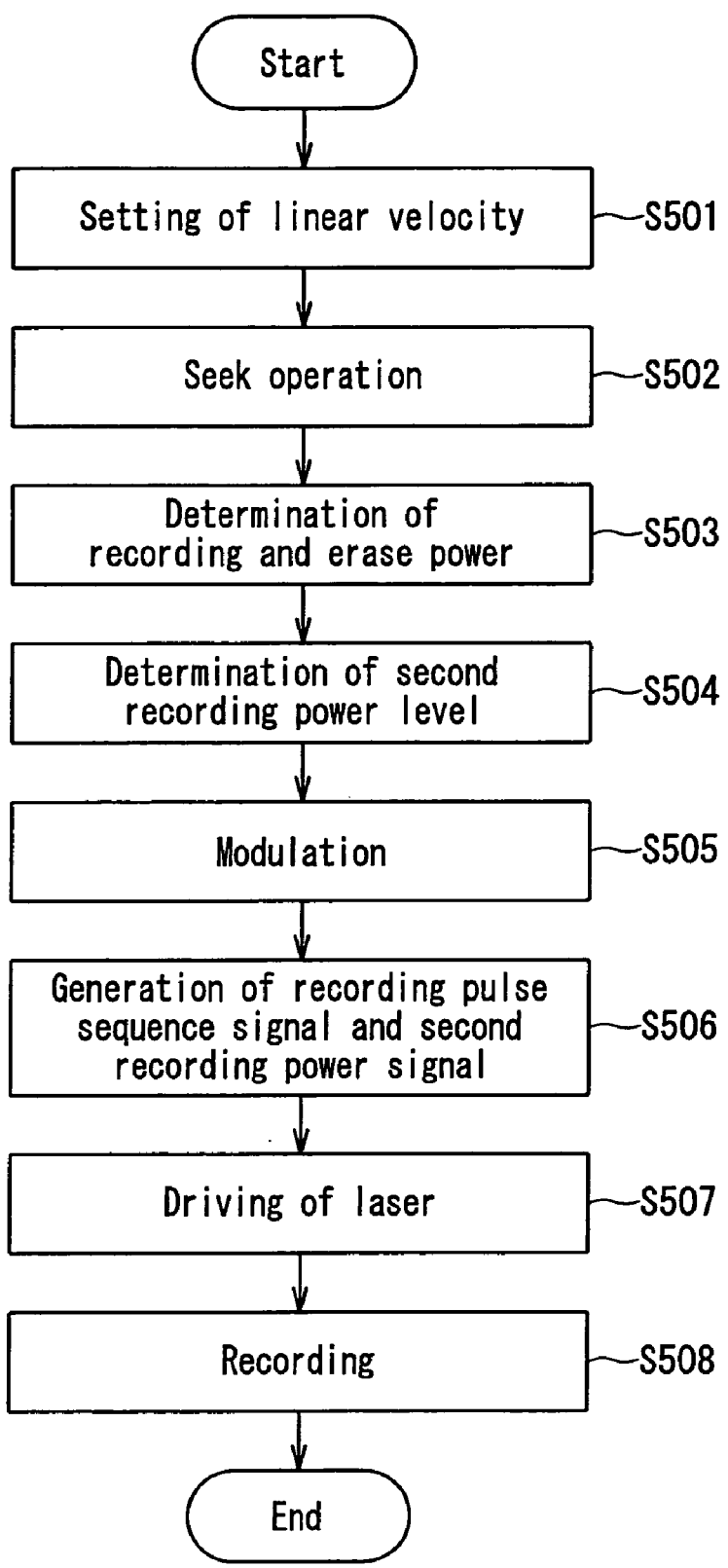
FIG. 5 is a flowchart showing an operation of an optical information recording device according to Embodiment 2 of the present invention.

FIG. 5 is a flowchart showing the operation of the optical information recording device of Embodiment 2. FIGS. 6 and 7 are waveform diagrams showing when recording is performed at the high linear velocity in Embodiment 2. In FIGS. 6 and 7, an operation of recording a mark having a code length of 5T is described as in FIGS. 3 and 4. FIGS. 5 and 6 show a waveform of a channel clock signal, a waveform of a modulation signal 11, a waveform of a recording pulse signal 12, a waveform of a second recording power level control signal, a light emission waveform of laser light 14, and states of respective tracks 301 and 401 after respective marks 302 and 402 are recorded by the laser light 14.

For recording, initially, in a linear velocity setting step 501, the linear velocity setting circuit 7 controls the rotational speed of the spindle motor 8 in accordance with an instruction from the system control circuit 2 to rotate the optical disc 1 at a predetermined linear velocity. Thereafter, in a seek operation step S502, the optical head 6 seeks a predetermined recording area on the optical disc 1.

In a recording and erase power determination step S503, the system control circuit 2 determines an optimum recording power level Pwa2 and erase power level Pe2 for this high linear velocity and outputs a power setting signal 15 to the laser drive circuit 5. The recording power level Pwa2 and the erase power level Pe2 may be determined by performing test recording on the optical disc 1 as in Embodiment 1. Alternatively, when information that indicates the recording power level and the erase power level previously is recorded in a control track area of the optical disc 1, the recording power level and the erase power level may be determined by reading the information. Embodiment 2 is similar to Embodiment 1 up to this point.

Thereafter, in a second recording power level determination step S504, the system control circuit 2 determines a second recording power level Pwb2 for the high linear velocity and outputs the power setting signal 15 to the laser drive circuit 5.

Figure 6:
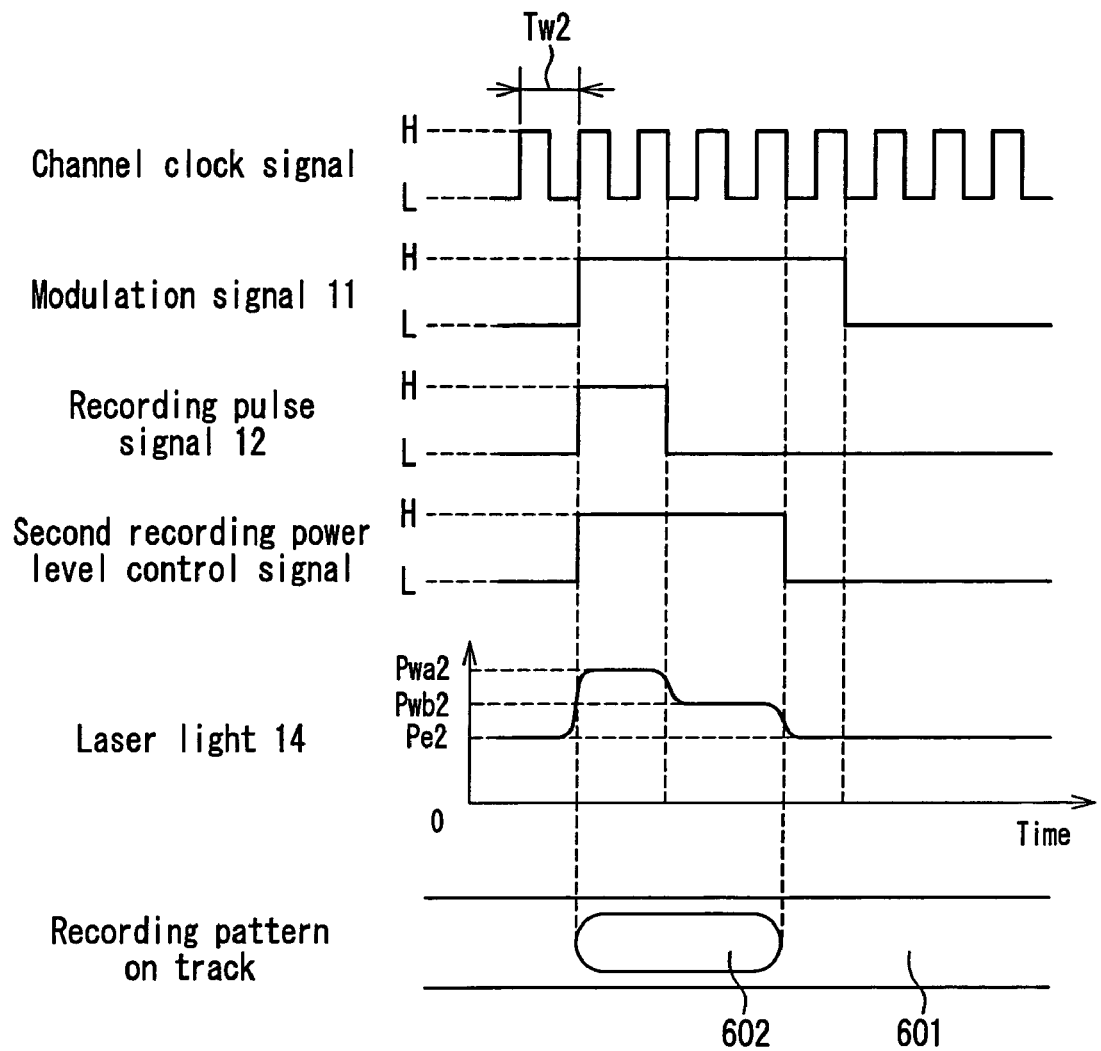
FIGS. 6 and 7 are signal waveform diagrams for explaining an operation of the optical information recording device of Embodiment 2.

Thereafter, in a modulation step S505, recording data from the system control circuit 2 is modulated by the modulation circuit 3 based on the channel clock signal of FIG. 6. The modulation circuit 3 outputs the modulation signal 11 of FIG. 6. In a recording pulse signal and second recording power level signal generation step S506, the recording pulse generation circuit 4 outputs the recording pulse signal 12 and the second recording power level control signal 13 as shown in FIG. 6 to the laser drive circuit 5 based on the modulation signal 11.

Thereafter, in a laser drive step S507, the laser drive circuit 5 modulates a power level of the laser light 14. This power level is determined based on signal levels of the recording pulse signal 12 and the second recording power level control signal 13. Specifically, the laser light 14 is emitted at the first recording power level Pwa2 when the recording pulse signal 12 is "H", at the second recording power level Pwb2 when the recording pulse signal 12 is "L" and the second recording power level control signal is "H", and at the erase power level Pe2 when the recording pulse signal 12 is "L" and the second recording power level control signal is "L". As a result, the light emission waveform of the laser light 14 has a power level that varies as shown in FIG. 6.

Thereafter, in a recording step S508, the laser light 14 forms the mark 602 corresponding to the code length 5T on the recording track 601 as shown in FIG. 6.

Embodiment 2 is different from Embodiment 1 in: (1) the laser drive circuit 5 is controlled using the second recording power level control signal Pwb2 instead of the inter-pulse power level control signal Pbt1; (2) the laser light 14 is emitted, varying in a stepwise manner from the first recording power level Pwa2 to the second recording power level Pwb2 (where Pwa2>Pwb2>Pe2), by combination of signal levels of the recording pulse signal 12 and the second recording power level control signal 13; and (3) a width of each step of the stepwise light emission waveform is longer than ½ of a cycle Tw2 of the channel clock signal by combination of the signal levels of the recording pulse signal 12 and the second recording power level control signal 13.

Figure 7:
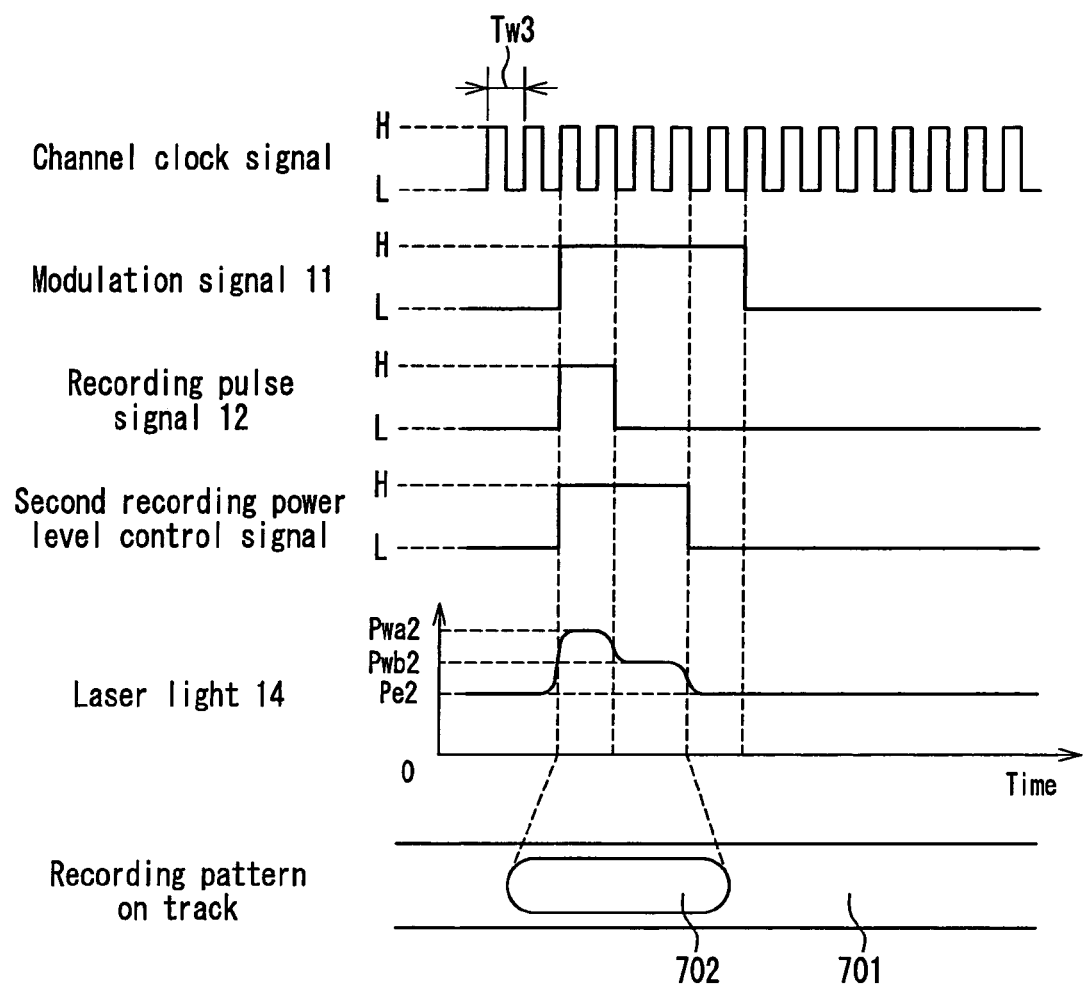
Figure 17:
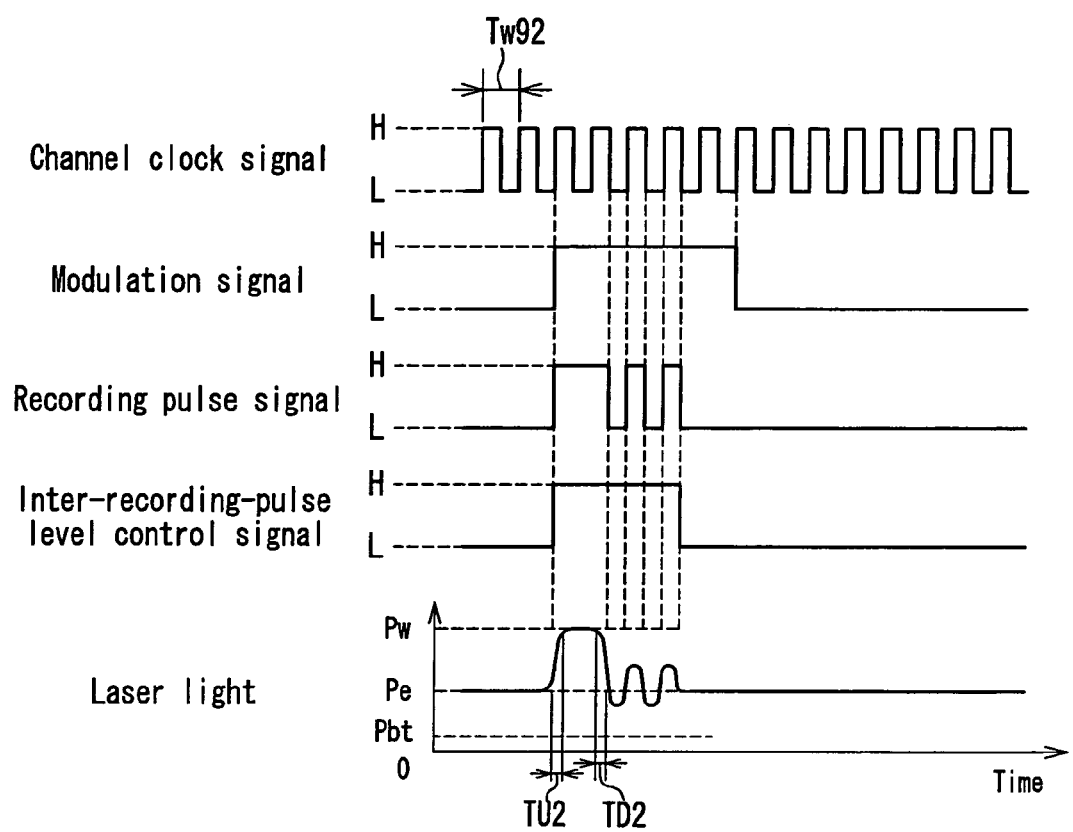
Figure 18:
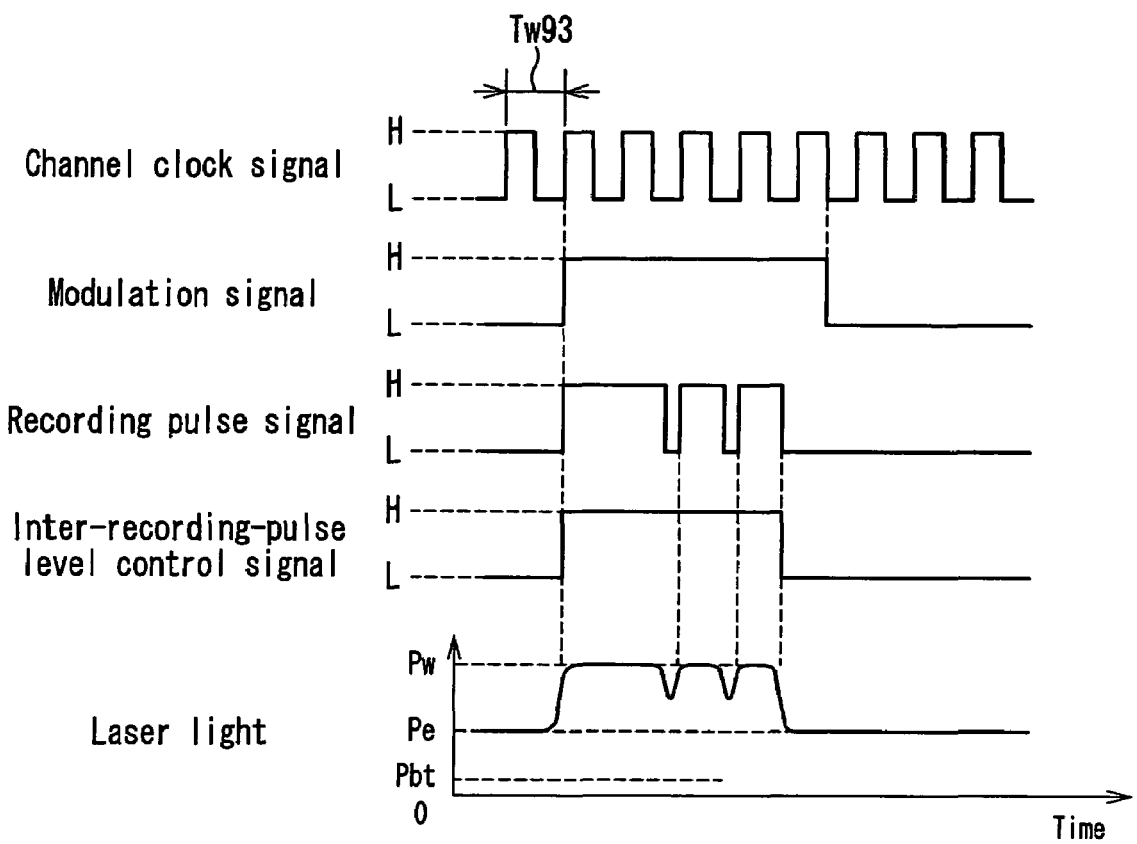
FIG. 18 is a signal waveform diagram for explaining another conventional optical information recording device.
Figure 19:
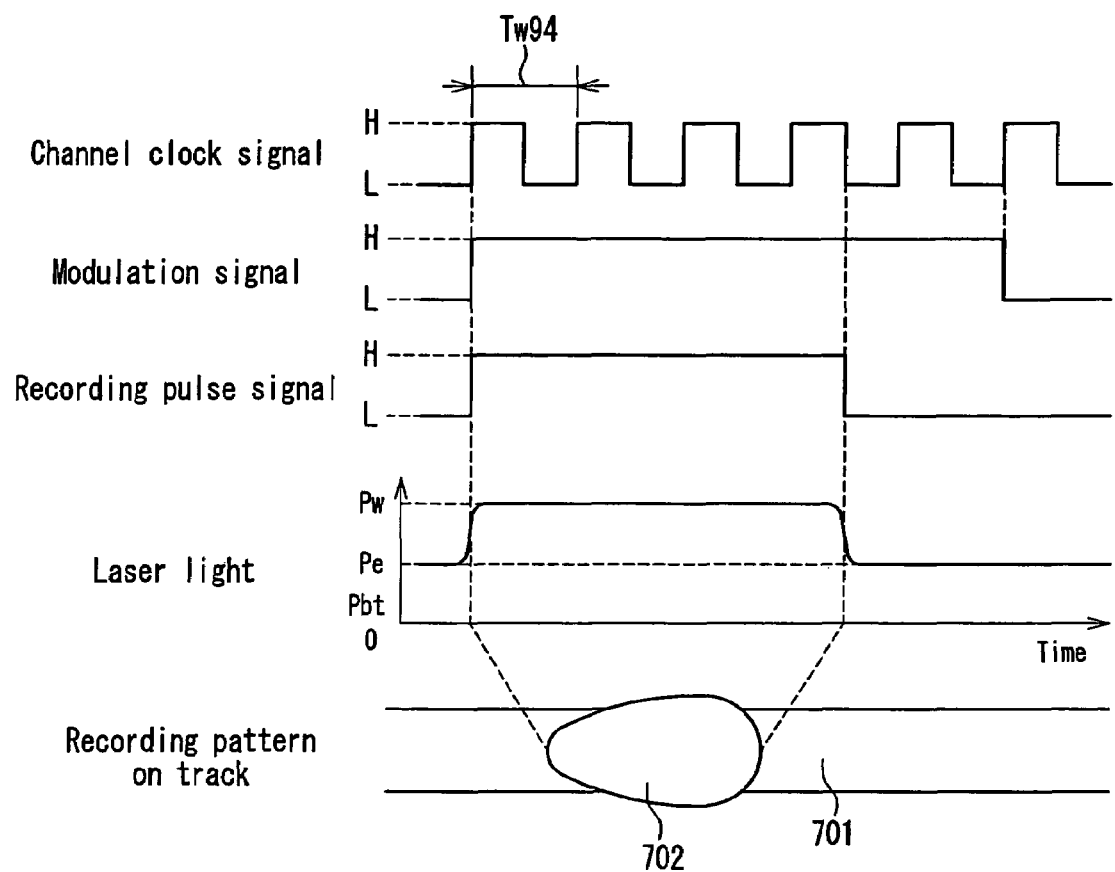
FIG. 19 is a signal waveform diagram for explaining still another conventional optical information recording device.

According to the above-described embodiment, even when a linear velocity is higher than what can be handled by Embodiment 1, i.e., a high linear velocity such that the sum of a rising time and a falling time is longer than ½ of a cycle of a channel clock signal as in the conventional example of FIG. 17, it is possible to emit the laser light 14 stably at a desired power level as shown in FIG. 7. Also, a power level for recording a front portion of the mark 702 is set to be higher than that for a rear portion of the mark 702. Therefore, even in the case of the high linear velocity (i.e., a relative speed between the laser light and the recording medium is high), an amount of energy sufficient for melting a recording layer can be supplied upon starting recording the mark 702, thereby making it possible to form the mark 702 stably. As a result, data can be recorded accurately.

As described above, an essence of Embodiment 2 is that the second recording power level Pwb2 is provided when recording is performed at the high linear velocity as shown in FIGS. 6 and 7. In addition, a light emission waveform is changed in a stepwise manner such that a high power level is used when recording the front portion of the mark 702, and the width of each step of the stepwise light emission waveform is longer than ½ of the cycle Tw2, Tw3 of a channel clock signal. With this operation, it is possible to form a mark without distortion over a wider linear velocity range than that of Embodiment 1. Thus, data can be recorded accurately.

(Embodiment 3)

In the above-described two Embodiments 1 and 2, recording is performed at two velocities, i.e., a low linear velocity and a high linear velocity. On the other hand, in the CAV recording technique, a linear velocity and a transfer rate vary continuously, depending on a recording/reproduction position on a medium. In such a case, preferably, by continuously joining a light emission waveform at the low linear velocity with a light emission waveform at the high linear velocity, a light emission waveform at an intermediate linear velocity is determined.

Figure 8A:
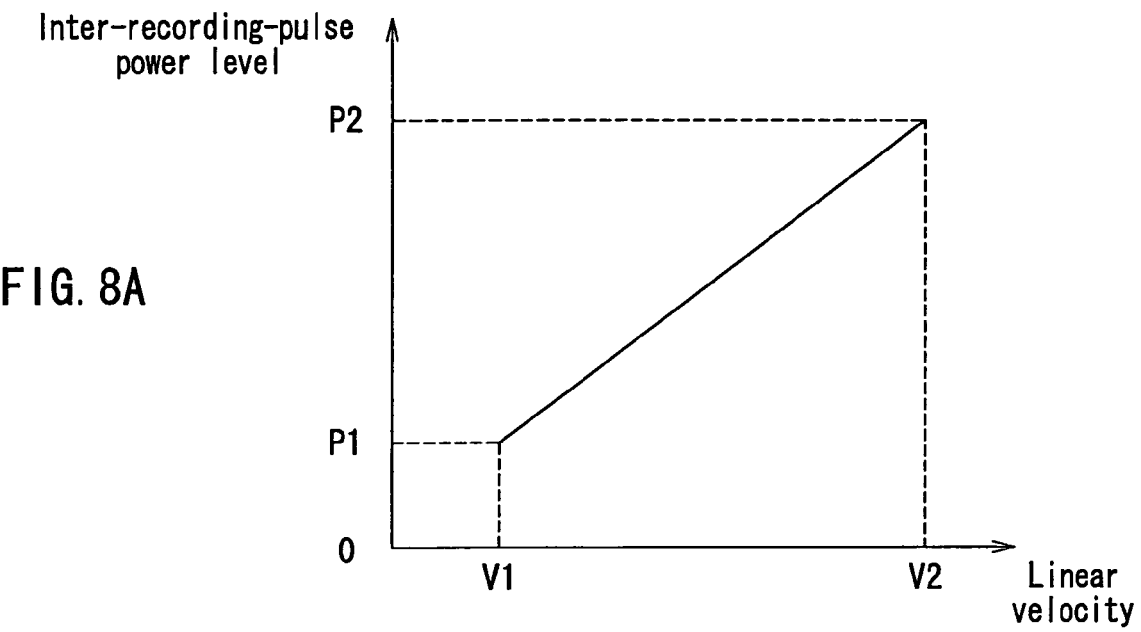
FIGS. 8A to 8C are schematic diagrams for explaining an operation of an optical information recording device according to Embodiment 3 of the present invention.
Figure 8B:
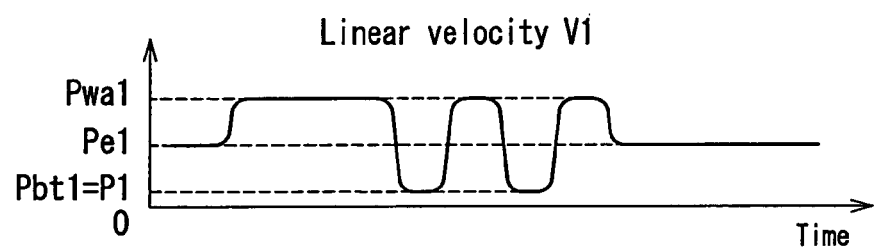
Figure 8C:
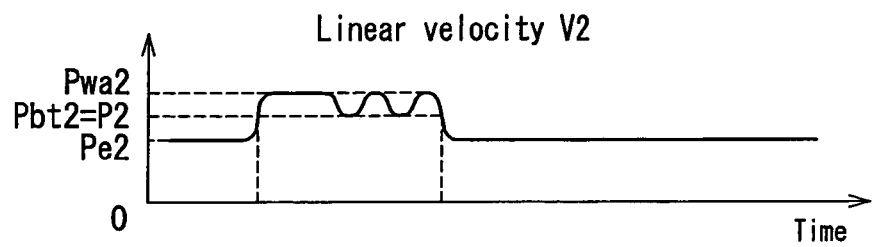

FIGS. 8A to 8C show an example of inter-pulse power level settings when a linear velocity varies continuously in a range from v1 to v2 in Embodiment 3. In this case, the laser light 14 is emitted in a light emission waveform shown in FIG. 8B for the linear velocity v1, while the laser light 14 is emitted in a light emission waveform shown in FIG. 8C for the linear velocity v2. A inter-pulse power level Pbt is changed smoothly between a power level Pbt1=p1 for the linear velocity v1 and a power level Pbt2=p2 for the linear velocity v2. This change may be provided in a linear form. Alternatively, the change may be provided in a manner that connects the two levels with a monotonic, smooth curve. Alternatively, the change may be provided in a monotonic, stepwise form.

It is desirable that the inter-pulse power level Pbt is set to be increased relatively with respect to the erase power level Pe, depending on an increase in a linear velocity. In other words, it is desirable that the inter-pulse power level Pbt is set so that (Pbt−Pe) is increased, depending on an increase in a linear velocity.

The above-described method of continuously changing the inter-pulse power level depending on the linear velocity has an advantage of easily constructing the device over the method of continuously changing the recording pulse width in the conventional example. The reason is as follows. In order to change the recording pulse width, it is necessary to provide a delay line in the recording pulse generation circuit, and further, it is necessary to adjust a delay time, resulting in a complicated circuit, while the inter-pulse power level can be set only by increasing or decreasing a laser drive current using the laser drive circuit 5.

Figure 9A:
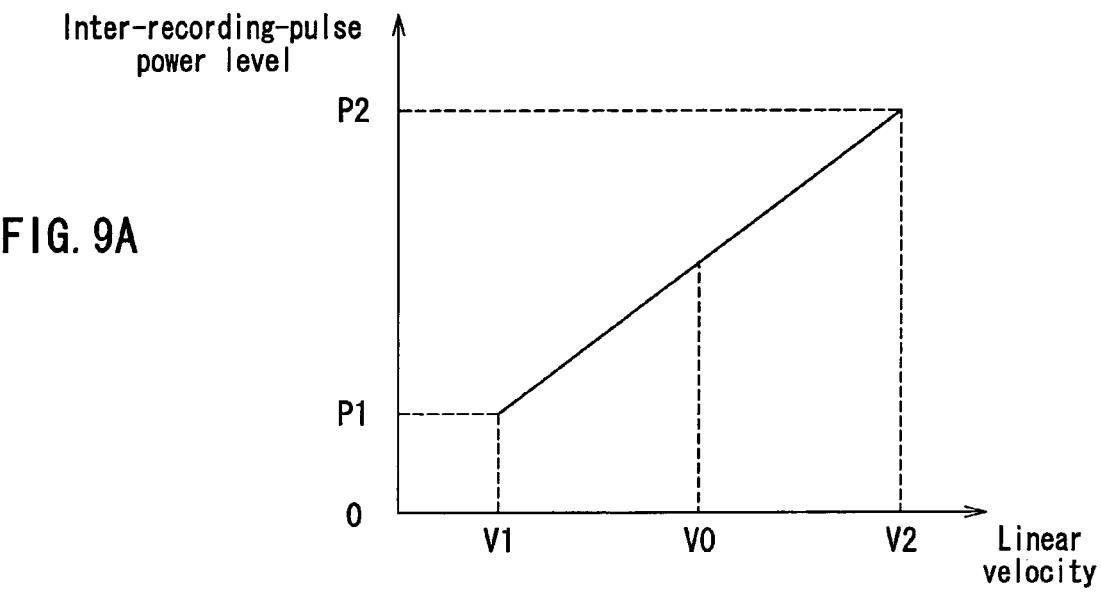
FIGS. 9A to 9D are schematic diagrams for explaining a variation of the operation of the optical information recording device of Embodiment 3.
Figure 9B:
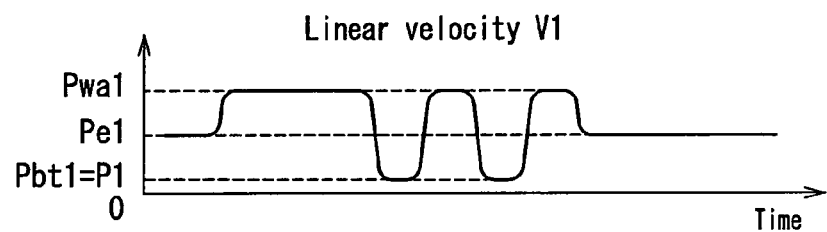
Figure 9C:
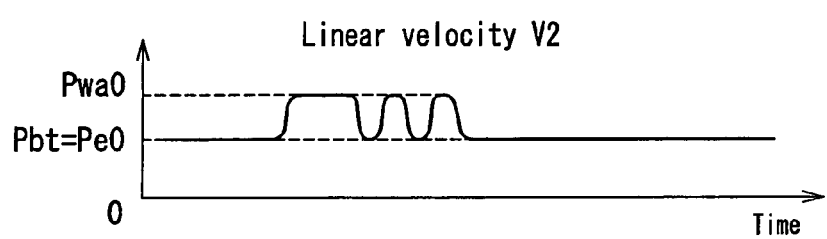
Figure 9D:
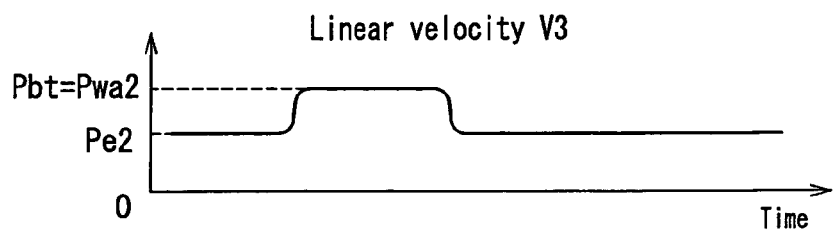
Figure 10A:
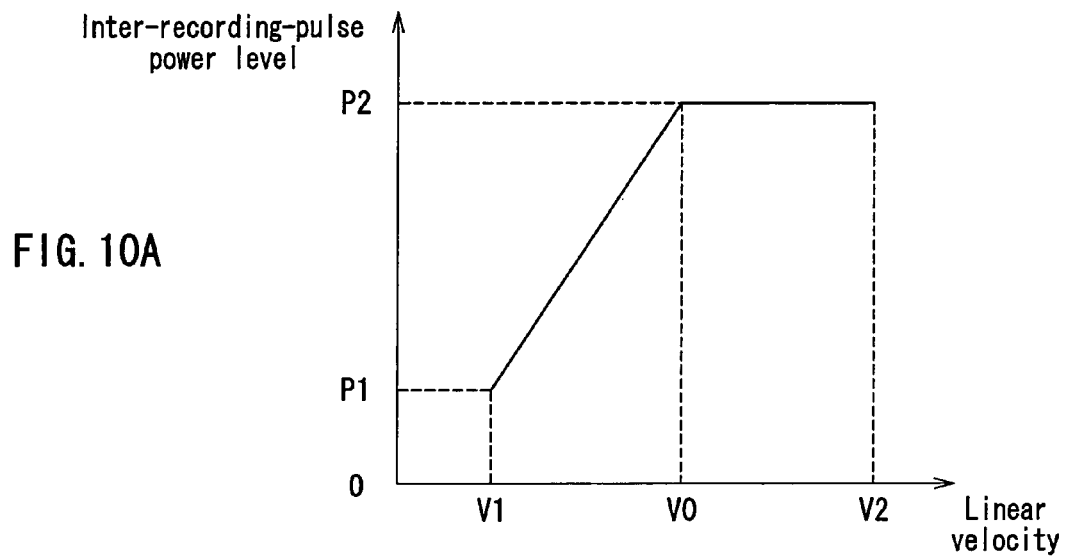
FIGS. 10A to 10D are schematic diagrams for explaining another variation of the operation of the optical information recording device of Embodiment 3.
Figure 10B:
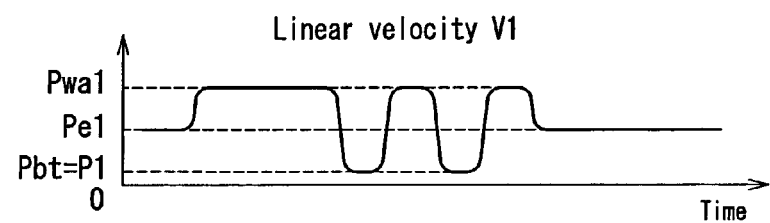
Figure 10C:
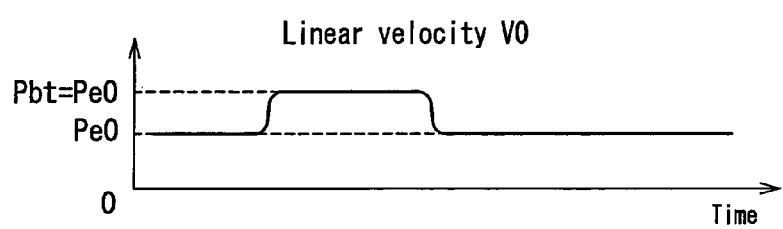
Figure 10D:
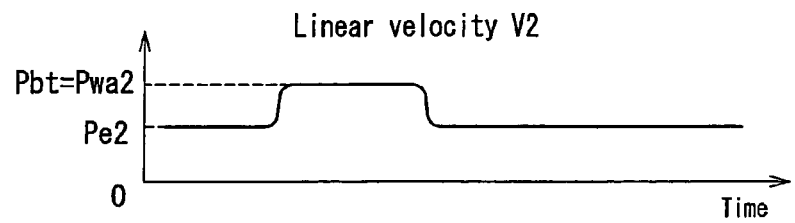

FIGS. 9A to 9D are diagrams showing a variation of the embodiment of FIGS. 8A to 8C, in which the inter-pulse power level Pbt is set to be equal to the recording power level Pwa2 for the maximum linear velocity v2 as shown in FIG. 9D (i.e., a light emission waveform having a rectangular wave).

FIGS. 10A to 10D are diagrams showing another variation of the embodiment of FIGS. 8A to 8C, in which, when a linear velocity is higher than v0, the inter-pulse power level Pbt is set to be equal to the recording power level Pwa2 and the recording pulse width is changed depending on the linear velocity.

In the case of the embodiments of FIGS. 9A to 9D and FIGS. 10A to 10D, the laser light 14 needs to be modulated at only two power levels, i.e., the recording power level Pwa2 and the erase power level Pe2, for a high linear velocity required for the high speed drive of a laser. Therefore, the structure of the laser drive circuit can be simplified and the manufacturing cost of the circuit can be advantageously reduced.

Figure 11A:
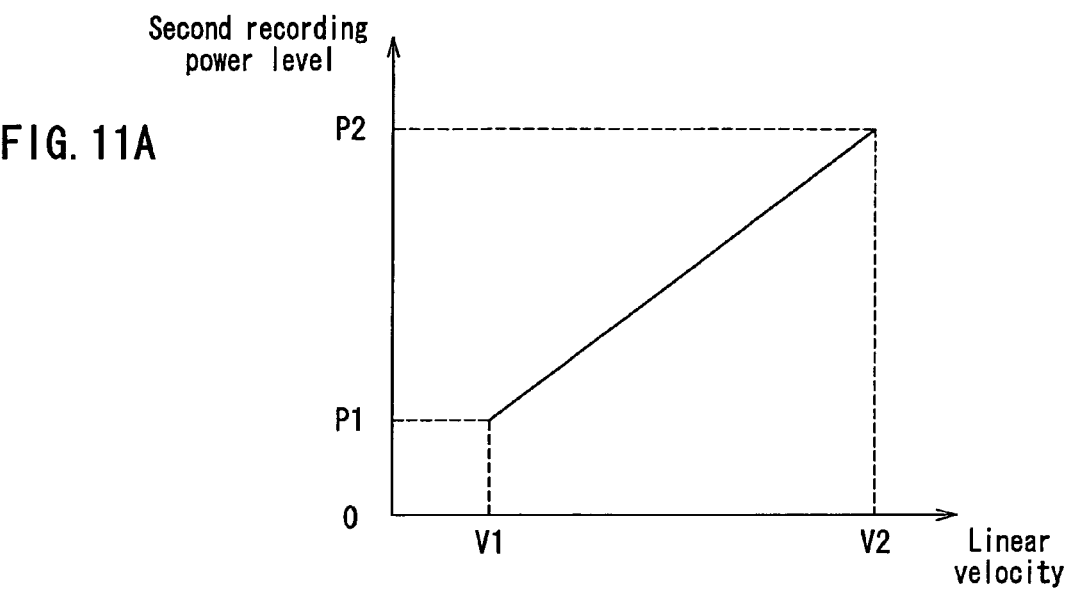
FIGS. 11A to 11C are schematic diagrams for explaining still another variation of the operation of the optical information recording device of Embodiment 3.
Figure 11B:
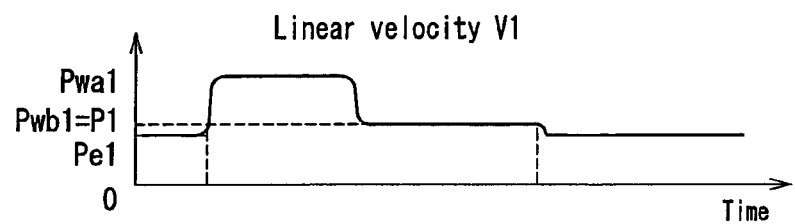
Figure 11C:
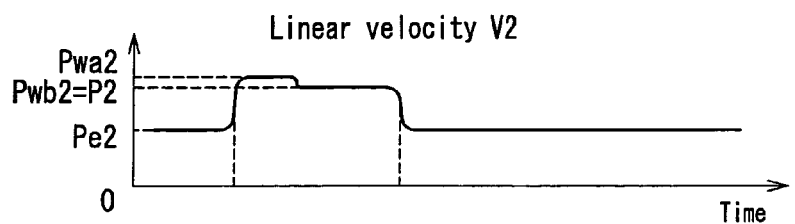
Figure 12A:
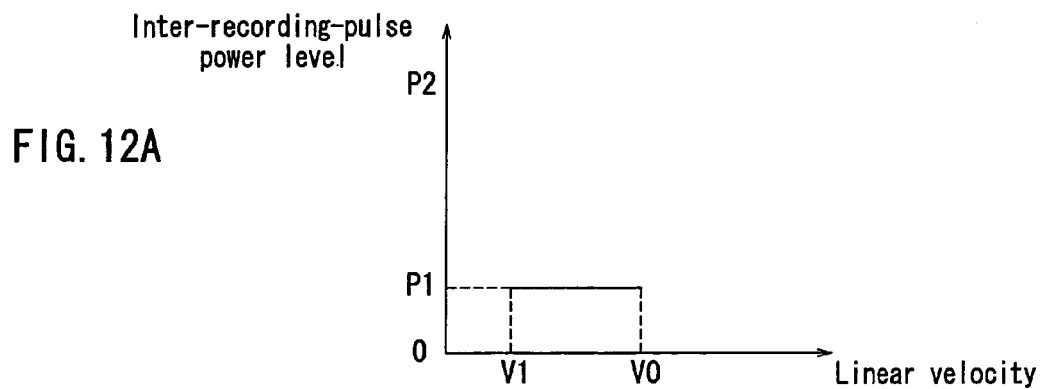
FIGS. 12A to 12E are schematic diagrams for explaining still another variation of the operation of the optical information recording device of Embodiment 3.
Figure 12B:
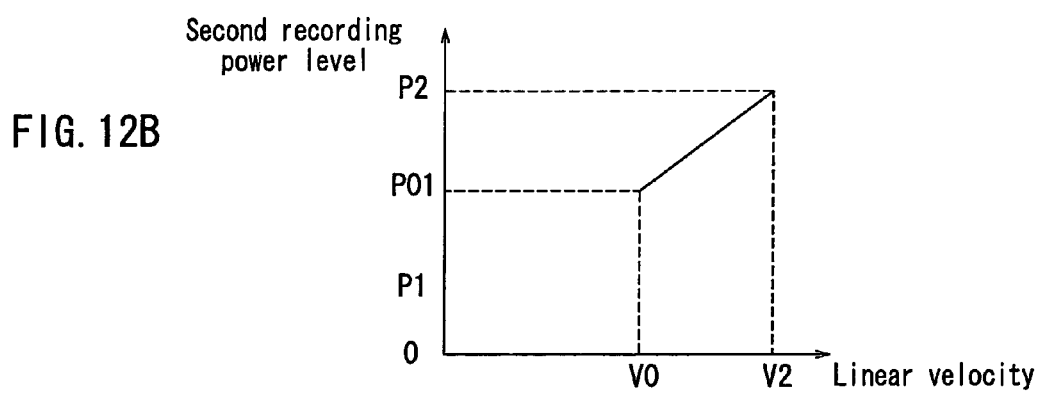
Figure 12C:
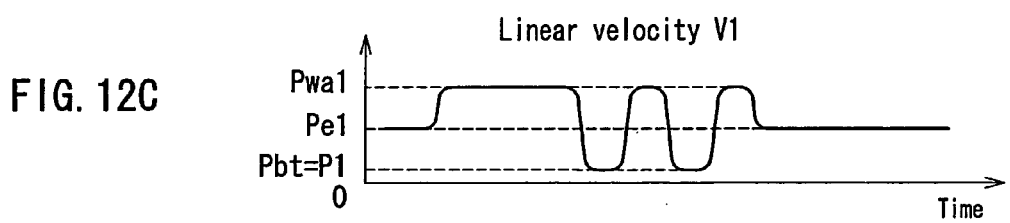
Figure 12D:
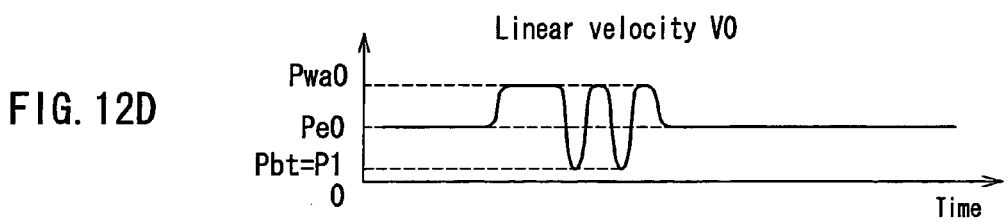
Figure 12E:
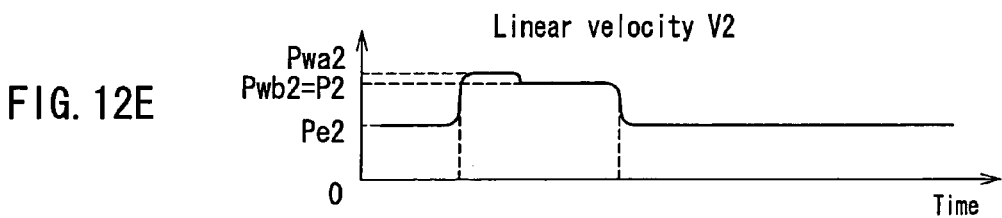
Figure 13A:
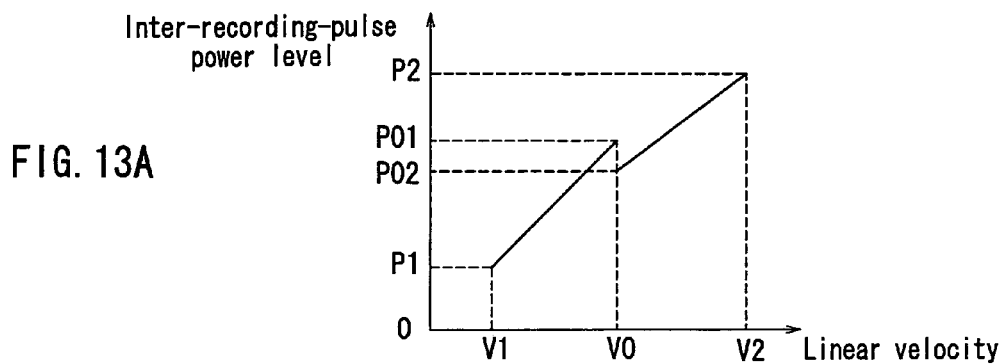
FIGS. 13A to 13F are schematic diagrams for explaining still another variation of the operation of the optical information recording device of Embodiment 3.
Figure 13B:
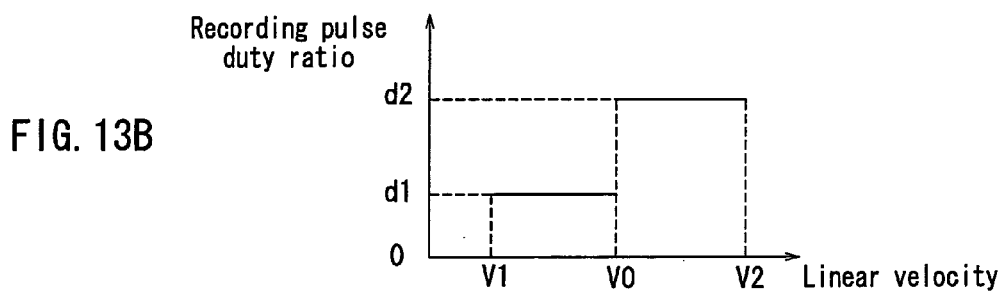
Figure 13C:
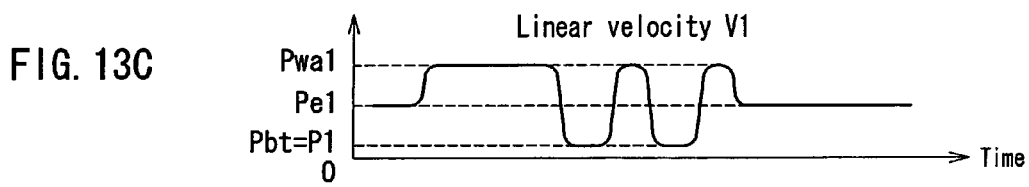
Figure 13D:
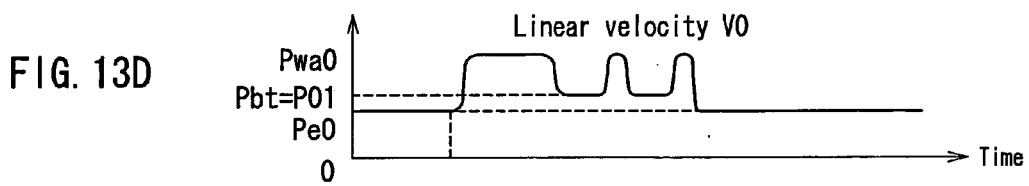
Figure 13E:
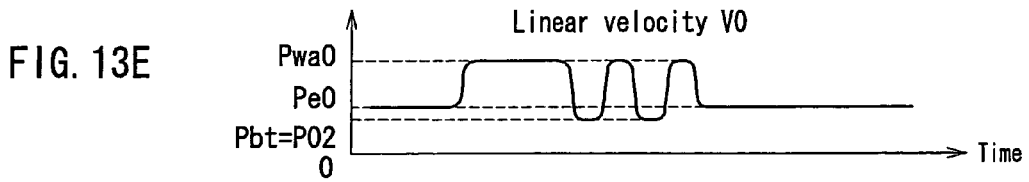
Figure 13F:
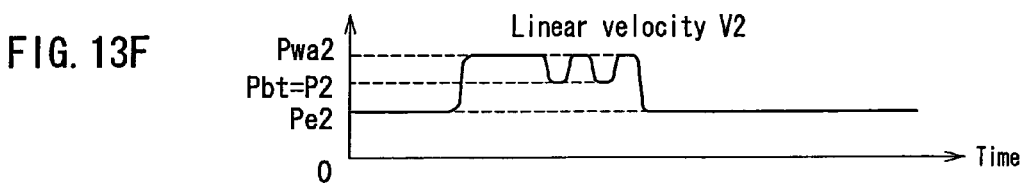

FIGS. 11A to 11C are diagrams showing still another variation of Embodiment 3. FIGS. 11A to 11C show an exemplary second recording power level setting when a linear velocity varies continuously in a range from v1 to v2. In this case, the laser light 14 is emitted in the waveform of FIG. 6 or 7 for both the linear velocities v1 and v2.

The second recording power level desirably is set to increase from Pwb1 to Pwb2 relatively with respect to the erase power levels Pe1 and Pe2 as the linear velocity increases from v1 to v2. In other words, the second recording power level desirably is set so that a value (Pwb−Pe) obtained by subtracting the erase power level from the second recording power level is increased, depending on an increase in the linear velocity.

In this embodiment, the power level does not vary depending on a recording pulse sequence. Therefore, it is preferable to operate within a high linear velocity range, in which a higher cooling rate in a recording layer is obtained.

FIGS. 12A to 12E are diagrams showing an embodiment in which recording can be performed at a further lower linear velocity in addition to the linear velocity range of the embodiment of FIG. 11 in which recording can be performed. In FIG. 12, recording is performed while changing the duty ratio of a recording pulse, depending on a linear velocity, as in the conventional example in a range of v1≦(linear velocity)≦v0 in which the sum of a rising time and a falling time is smaller than the recording pulse width (or the inter-pulse width). In addition, in a range of v0≦(linear velocity)≦v2 (i.e., a linear velocity higher than v0), the light emission waveform is switched to a stepwise form, such as that described in Embodiment 2, and recording is performed while changing the second recording power level Pwb2, depending on the linear velocity. As a result, data can be recorded accurately in a range wider than that of the embodiment of FIG. 11.

FIGS. 13A to 13F are diagrams showing an embodiment in which the duty ratio of the recording pulse is changed depending on the linear velocity, and the power level of the inter-pulse is changed continuously. In FIGS. 13A to 13F, ranges of v1≦(linear velocity)≦v0 and v0≦(linear velocity)≦v2 have predetermined respective duty ratios of recording pulses different from each other. In addition, the linear velocity is continuously changed in each of the ranges of v1≦(linear velocity)≦v0 and v0≦(linear velocity)≦v2.

As the conventional example, when only the duty ratio of the recording pulse is changed depending on the linear velocity, the duty ratio usually is set to be only discrete. Therefore, recording characteristics disadvantageously vary depending on the recording linear velocity (the recording position in the case of the CAV recording technique). In contrast to this, in the example of FIGS. 13A to 13F, the power level of the inter-pulse is changed in a linear velocity range in which the duty ratio is uniform, thereby making it possible to reduce a variation in the recording characteristics.

Further, in addition to the embodiment of FIG. 13A to 13F, in order to avoid an influence of heat interference between marks, edge positions of recording pulses (e.g., a front edge position of a leading recording pulse and a rear edge position of a last recording pulse) may be corrected at each of the linear velocities v1 and v0 with reference to a channel clock. When a recording device or a recording medium has information that indicates the above-described corrected value, the following method is preferably used.

In v1≦(linear velocity)<v0 an edge position corrected at the linear velocity v1 is used, while in v0≦(linear velocity)≦v2 an edge position corrected at the linear velocity v0 is used. In this case, it is not necessary for a recording device or a recording medium to have information for correcting a number of edge positions for each minute linear velocity intervals. Therefore, the structure of the recording device can be simplified and an area of the recording medium that is required for having information that indicates a correction value can be reduced, thereby making it possible to increase an area for recording data.

Figure 14A:
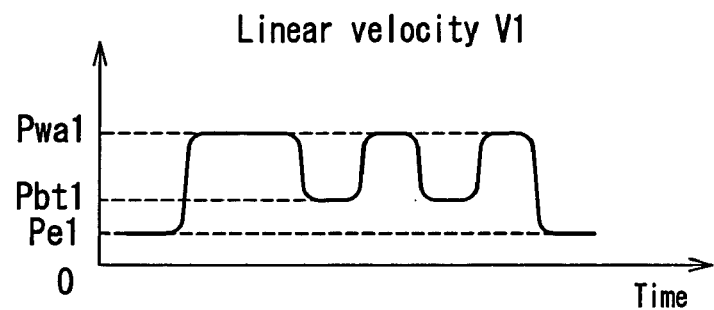
FIGS. 14A and 14B are schematic diagrams for explaining still another variation of the operation of the optical information recording device of Embodiment 3.
Figure 14B:
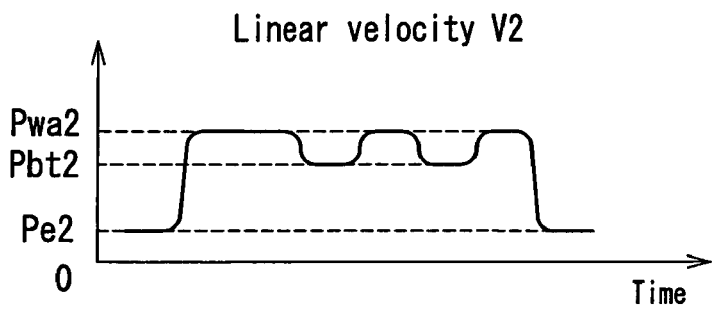
Figure 15A:
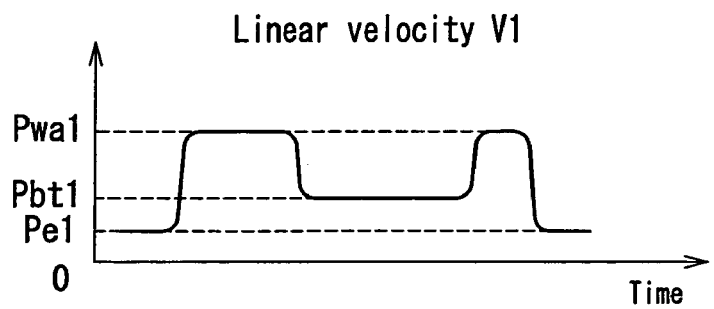
FIGS. 15A and 15B are schematic diagrams for explaining still another variation of the operation of the optical information recording device of Embodiment 3.
Figure 15B:
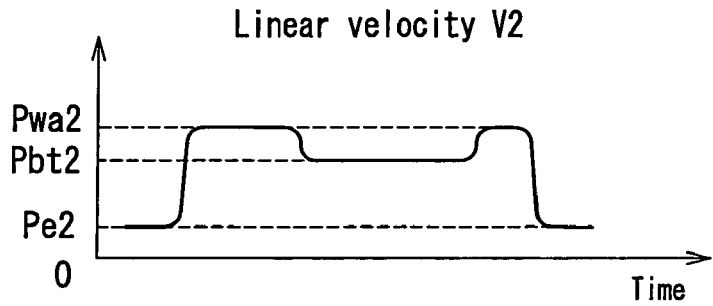
Figure 16:
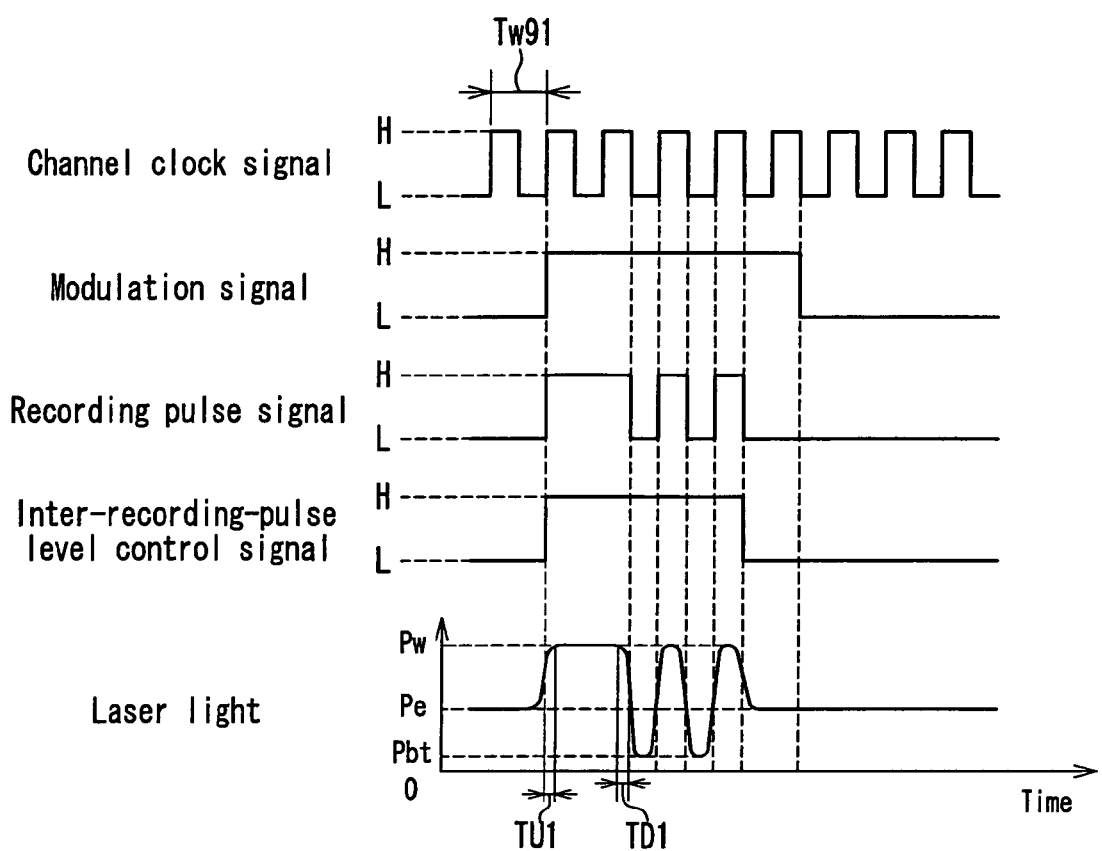
FIGS. 16 and 17 are signal waveform diagrams for explaining an operation of a conventional optical information recording device.

FIGS. 14A and 14B and FIGS. 15A to 15B are diagrams showing still another variation of Embodiment 3. In the example of Embodiment 1 described above with reference to FIGS. 3 and 4, the inter-pulse power Pbt1 is set to be lower than or equal to the erase power level Pe1 for the low linear velocity v1. Alternatively, as shown in FIGS. 14A and 15A, the inter-pulse power level Pbt1 may be set to be higher than or equal to the erase power level Pe1 for the low linear velocity v1.

As an example of the power setting method in the above-described Embodiments 1 and 3, the recording power level Pwa1, the erase power level Pe1 and the inter-pulse power level Pbt1 for the low linear velocity v1, and the recording power level Pwa2, the erase power level Pe2 and the inter-pulse power level Pbt2 for the high linear velocity v2 are set in a manner that satisfies the Formula 1 as follows.

$$(Pbt1-Pe1)/(Pwa1-Pe1) < (Pbt2-Pe2)/(Pwa2-pe2) \quad \text{(Formula 1)}$$

In the embodiment of the present invention in which the power level is changed depending on the linear velocity as shown in FIGS. 8–15B, the simplest method of determining a value of a varying power level is such that values of optimum power levels for the linear velocities v1, v2 and v0 are determined by test recording, and a power level between each of them is determined by interpolation from the power levels at v1, v2 and v0.

Further, in each of the above-described embodiments, when information that indicates a power level varying depending on a linear velocity previously is recorded in a control track of a medium (i.e., an area recording information about the medium), it is advantageously possible to determine a power level corresponding to a linear velocity immediately after the medium is loaded into an optical information recording device. This power level information may be recorded onto a medium by an optical information recording device or may be previously recorded during production of a medium.

As described above, in the embodiment of the present invention, by changing the inter-pulse power level Pbt, depending on the linear velocity, laser light can be stably modulated over a wide linear velocity range and a mark without distortion can be formed, thereby making it possible to record data accurately.

Also in the embodiment of the present invention, by providing the second recording power level for recording at a high linear velocity and causing a light emission waveform to vary so that it has a high, stepwise power level when recording a front portion of a mark, laser light can be modulated stably over a wider linear velocity range and a mark without distortion can be formed, thereby making it possible to record data accurately.

Note that the above-described modulation technique, the length and position of each pulse and the like are not limited to those described in each of the above-described embodiments and can be set appropriately depending on recording conditions or a medium. Further, in order to avoid an influence of heat interference between marks, an edge position of a recording pulse may be corrected. Furthermore, a cooling pulse may be added after a recording pulse or a recording pulse sequence.

Further, the above-described method can be applied to any optical disc medium that has optical characteristics different between a mark and a space, such as those made of a phase change material, a magneto-optical material, a pigment material or the like.

Further, an effect similar to that described above can be obtained in a personal computer, a server and a recorder using the optical information recording method, the optical information recording device and the optical information recording medium of the embodiment of the present invention.

As described above, according to the optical information recording method of the embodiment of the present invention, by changing the inter-pulse power level Pbt, depending on the linear velocity, laser light can be stably modulated over a wide linear velocity range and a mark without distortion can be formed, thereby making it possible to record data accurately.

Further, according to the optical information recording method of the embodiment of the present invention, by providing a second recording power level for recording at a high linear velocity and causing a light emission waveform to vary so that it has a high, stepwise power level when recording a front portion of a mark, laser light can be stably modulated over a wider linear velocity range and a mark without distortion can be formed, thereby making it possible to record data accurately.

INDUSTRIAL APPLICABILITY

As described above, according to the present invention, it is possible to provide an optical information recording method, an optical information recording device and an optical information recording medium that can record/reproduce data onto/from the same medium with stability and satisfactory signal quality over a wide linear velocity range.

The invention claimed is:

1. An optical information recording device, wherein a mark or a space having a length corresponding to a length of a data recording code is formed by irradiating a rotating optical information recording medium with laser light to change optical characteristics of a photosensitive recording layer, and the mark is formed by irradiating the rotating optical information recording medium with the laser light with a power being switched among a plurality of power levels including at least a recording power level and an erase power level, the device comprising:
a linear velocity setting portion for setting a first linear velocity v1 and a second linear velocity v2 that is higher than the first linear velocity v1 for the rotating optical information recording medium;
a recording pulse generation portion for generating a recording pulse signal composed of a recording pulse and/or a recording pulse train, depending on a result of setting by the linear velocity setting portion; and
a laser drive portion for irradiating the optical information recording medium with the laser light based on the recording pulse signal generated by the recording pulse generation portion, wherein the laser drive portion controls a power level of the laser light in such a manner that
$Pbt1 \leq Pe1$ and $Pe2 < Pbt2 < Pwa2$ is satisfied,
where Pbt1 represents a first inter-pulse power level indicating a power level between recording pulses in the recording pulse train for the first linear velocity v1,
Pbt2 represents a second inter-pulse power level indicating a power level between the recording pulses in the recording pulse train for the second linear velocity v2,
Pwa2 represents a recording power level indicating a power level of the recording power for the second linear velocity v2,
Pe1 represents a first erase power level indicating a power level of the erase power for the first linear velocity v1, and
Pe2 represents a second erase power level indicating a power level of the erase power for the second linear velocity v2.

2. The optical information recording device according to claim 1, wherein the laser drive portion controls the inter-pulse power level Pbt so that (Pbt−Pe) is increased between Pbt1 and Pbt2, depending on an increase in the linear velocity v,
where Pbt represents a power level between the recording pulses in the recording pulse train for a linear velocity v of v1<v<v2, and
Pe represents a power level of the erase power for the linear velocity v.

3. The optical information recording device according to claim 1, wherein a waveform of the recording pulse is a rectangular wave for a predetermined linear velocity of v0 or more, v0 satisfying a relationship v1<v0<v2.

4. An optical information recording device, wherein a mark or a space having a length corresponding to a length of a data recording code is formed by irradiating a rotating optical information recording medium with laser light to change optical characteristics of a photosensitive recording layer, and the mark is formed by irradiating the rotating optical information recording medium with the laser light with a power being switched among a plurality of power levels including at least a recording power level and an erase power level, the device comprising:
a linear velocity setting portion for setting a first linear velocity v1 and a second linear velocity v2 that is higher than the first linear velocity v1 for the rotating optical information recording medium;

a recording pulse generation portion for generating a recording pulse signal composed of a recording pulse and/or a recording pulse train, depending on a result of setting by the linear velocity setting portion; and a laser drive portion for irradiating the optical information recording medium with the laser light based on the recording pulse signal generated by the recording pulse generation portion, wherein the laser drive portion controls a power level of the laser light in such a manner that Pbt1≦Pe1 and Pe2<Pwb2<Pwa2 is satisfied, and a waveform of the laser light for the second linear velocity v2 is set to be a stepwise waveform such that a recording pulse of the power level Pwb2 is provided immediately after a recording pulse of the power level Pwa2, where Pbt1 represents a first inter-pulse power level indicating a power level between recording pulses in the recording pulse train for the first linear velocity v1, Pwa2 represents a recording power indicating a power level of the recording power for the second linear velocity v2, Pwb2 represents a second recording power indicating a power level of a second recording power for the second linear velocity v2, Pe1 represents a first erase power level indicating a power level of the erase power for the first linear velocity v1, and Pe2 represents a second erase power level indicating a power level of the erase power for the second linear velocity v2.

5. The optical information recording device according to claim 4, wherein the recording pulse generation portion sets a width of each step of the stepwise waveform to be longer than ½ of a channel clock cycle for the second linear velocity v2.

6. An optical information recording device, wherein a mark or a space having a length corresponding to a length of a data recording code is formed by irradiating a rotating optical information recording medium with laser light to change optical characteristics of a photosensitive recording layer, and the mark is formed by irradiating the rotating optical information recording medium with the laser light with a power being switched among a plurality of power levels including at least a recording power level and an erase power level, the device comprising:

a linear velocity setting portion for setting a first linear velocity v1, which is a lower limit, and a second linear velocity v2, which is an upper limit, with respect to the rotating optical information recording medium, a recording pulse generation portion for generating a recording pulse signal composed of a recording pulse and/or a recording pulse train, depending on a result of setting by the linear velocity selling portion; and a laser drive portion for irradiating the optical information recording medium with the laser light based on the recording pulse signal generated by the recording pulse generation portion, wherein Pbt1≦Pe1 and Pe2<Pwb2<Pwa2 are satisfied, the laser light is irradiated while switching powers among the recording power level, the first erase power level and the first inter-pulse power level, when the linear velocity v is v1<v<v0, where v0 represents a predetermined linear velocity, a waveform of the laser light is set to be a stepwise waveform such that a recording pulse of the power level Pwb2 is provided immediately after a recording pulse of the power level Pwa2, when the linear velocity v is v0<v<v2, and the power level Pwb of the second recording power is controlled so that (Pwb−Pe) is increased, depending on an increase in the linear velocity v, where Pbt1 represents a first inter-pulse power level indicating a power level between recording pulses in the recording pulse train for the first linear velocity v1, Pwa2 represents a recording power indicating a power level of the recording power for the second linear velocity v2, Pwb2 represents a second recording power indicating a power level of a second recording power for the second linear velocity v2, Pe1 represents a first erase power level indicating a power level of the erase power for the first liner velocity v1, Pe2 represents a second erase power level indicating a power level of the erase power for the second linear velocity v2, v1<v<v2 is satisfied, Pwb represents a power level of the second recording power for a linear velocity v of v1<v<v2, and Pe represents a power level of the erase power for the liner velocity v.

7. The optical information recording device according to claim 6, wherein the recording pulse generation portion sets a width of each step of the stepwise waveform to be longer than ½ of a channel clock cycle for the second linear velocity v2.

8. An optical information recording device, wherein a mark or a space having a length corresponding to a length of a data recording code is formed by irradiating a rotating optical information recording medium with laser light to change optical characteristics of a photosensitive recording layer, and the mark is formed by irradiating the rotating optical information recording medium with the laser light with a power being switched among a plurality of power levels including at least a recording power level and en erase power level, the device comprising:

a linear velocity setting portion for setting a first linear velocity v1, which is a lower limit, and a second linear velocity v2, which is an upper limit, with respect to the rotating optical information recording medium, a recording pulse generation portion for generating a recording pulse signal composed of a recording pulse and/or a recording pulse train, depending on a result of setting by the linear velocity setting portion; and a laser drive portion for irradiating the optical information recording medium with the laser light based on the recording pulse signal generated by the recording pulse generation portion, wherein duty ratios of the recording pulses are set to be constant when the linear velocity v is v1≦v<v0 and when the linear velocity v is v0<v≦v2, respectively, and the power level Pbt of the inter-pulse is controlled so that (Pbt−Pe) is increased, depending on an increase in the linear velocity v, when the linear velocity v is v1≦v<v0 and when the linear velocity v is v0<v≦v2, respectively, where v0 represents a predetermined linear velocity, where Pbt represents a power level between the recording pulses in the recording pulse train for a linear velocity v of v1<v<v2, Pe represents a power level of the erase power for the linear velocity v, and v1<v0<v2.

9. The optical information recording device according to claim 8, wherein a correction amount of an edge position of the recording pulse is controlled to be constant with reference to a channel clock cycle when the linear velocity v is v1≦v<v0 end when the linear velocity v is v0<v≦v2, respectively, where v0 represents a predetermined linear velocity.

10. An optical information recording method, wherein a mark or a space having a length corresponding to a length of a data recording code is formed by irradiating a rotating optical information recording medium with laser light to change optical characteristics of a photosensitive recording layer, and the mark is formed irradiating the rotating optical information recording medium with the laser light with a power being switched among a plurality of power levels including at least a recording power level and an erase power level, the method comprising:
a linear velocity setting step of setting a first linear velocity v1 and a second linear velocity v2 that is higher than the first linear velocity v1 for the rotating optical information recording medium;
a recording pulse generation step of generating a recording pulse signal composed of a recording pulse and/or a recording pulse train, depending on a result of setting by the linear velocity setting step; and
a laser drive step of irradiating the optical information recording medium with the laser light based on the recording pulse signal generated by the recording pulse generation step,
wherein in a laser drive step, a power level of the laser light is controlled in such a manner that
Pbt1≦Pe1 and Pe2<Pbt2<Pwa2 is satisfied, where Pbt1 represents a first inter-pulse power level indicating a power level between recording pulses in the recording pulse train for the first linear velocity v1,
Pbt2 represents a second inter-pulse power level indicating a power level between the recording pulses in the recording pulse train for the second linear velocity v2,
Pwa2 represents a recording power level indicating a power level of the recording power for the second linear velocity v2,
Pe1 represents a first erase power level indicating a power level of the erase power for the first linear velocity v1, and
Pe2 represents a second erase power level indicating a power level of the erase power for the second linear velocity v2.

11. The optical information recording method according to claim 10, wherein in the laser drive step, the inter-pulse power level Pbt is controlled so that (Pbt−Pe) is increased between Pbt1 and Pbt2, depending on an increase in the linear velocity v, where Pbt represents a power level between the recording pulses in the recording pulse train for a linear velocity v of v1<v<v2, and
Pe represents a power level of the erase power for the linear velocity v.

12. The optical information recording method according to claim 10, wherein a waveform of the recording pulse is a rectangular wave for a predetermined linear velocity of v0 or more v0 satisfying a relationship v1<v0<v2.

13. The optical information recording method according to claim 10, wherein data is recorded onto the optical information recording medium using a CAV recording technique.

14. An optical information recording medium to be used for recording data by the optical information recording method according to claim 10, comprising information recorded thereon that indicates values of the first inter-pulse power level Pbt1 and the second inter-pulse power level Pbt2.

15. An optical information recording method, wherein a mark or a space having a length corresponding to a length of a data recording code is formed by irradiating a rotating optical information recording medium with laser light to change optical characteristics of a photosensitive recording layer, and the mark is formed by irradiating the rotating optical information recording medium with the laser light with a power being switched among a plurality of power levels including at least a recording power level and an erase power level, the method comprising:
a linear velocity setting step of setting a first linear velocity v1 and a second linear velocity v2 that is higher than the first linear velocity v1 for the rotating optical information recording medium;
a recording pulse generation step of generating a recording pulse signal composed of a recording pulse and/or a recording pulse train, depending on a result of setting by the linear velocity setting step; and
a laser drive step of irradiating the optical information recording medium with the laser light based on the recording pulse signal generated by the recording pulse generation step,
wherein in the laser drive step, a power level of the laser light is controlled in such a manner that
Pbt1≦Pe1 and Pe2<Pwb2<Pwa2 is satisfied, and
a waveform of the laser light for the second linear velocity v2 is caused to be a stepwise waveform such that a recording pulse of the power level Pwb2 is provided immediately after a recording pulse of the power level Pwa2, where Pbt1, represents a first inter-pulse power level indicating a power level between recording pulses in the recording pulse train for the first linear velocity v1,
Pwa2 represents a recording power indicating a power level of the recording power for the second linear velocity v2,
Pwb2 represents a second recording power indicating a power level of a second recording power for the second linear velocity v2,
Pe1 represents a first erase power level indicating a power level of the erase power for the first linear velocity v1, and
Pe2 represents a second erase power level indicating a power level of the erase power for the second linear velocity v2.

16. The optical information recording method according to claim 15, wherein in the recording pulse generation step, a width of each step of the stepwise waveform is set to be longer than ½ of a channel clock cycle for the second liner velocity v2.

17. An optical information recording medium to be used for recording data by the optical information recording method according to claim 15, comprising information recorded thereon that indicates values of the first inter-pulse power level Pbt1 and the second recording power level Pwb2.

18. The optical information recording method according to claim 15, wherein data is recorded onto the optical information recording medium using a CAV recording technique.

19. An optical information recording method, wherein a mark or a space having a length corresponding to a length of a data recording code is formed by irradiating a rotating optical information recording medium with laser light to change optical characteristics of a photosensitive recording layer, and the mark is formed by irradiating the rotating optical information recording medium with the laser light with a power being switched among a plurality of power levels including at least a recording power level and an erase power level, the method comprising:
    a liner velocity setting step of setting a first liner velocity v1, which is a lower limit, and a second linear velocity v2, which is an upper limit, with respect to the rotating optical information recording medium,
    a recording pulse generation step of generating a recording pulse signal composed of a recording pulse and/or a recording pulse train, depending on a result of setting by the linear velocity setting portion; and
    a laser drive step of irradiating the optical information recording medium with the laser light based on the recording pulse signal generated by the recording pulse generation portion, wherein Pbt1≦Pe1 and Pe2<Pwb2<Pwa2 are satisfied, the laser light is emitted while switching powers among the recording power level, the first erase power level and the first inter-pulse power level, when the linear velocity v is v1<v<v0, where v0 represents a predetermined linear velocity, a waveform of the laser light is caused to be a stepwise waveform such that a recording pulse of the power level Pwb2 is provided immediately after a recording pulse of the power level Pwa2, when the linear velocity v is v0<v<v2, and the power level Pwb of the second recording power is controlled so that (Pwb−Pe) is increased, depending on an increase in the linear velocity v, where Pbt1 represents a first inter-pulse power level indicating a power level between recording pulses in the recording pulse train for the first linear velocity v1, Pwa2 represents a recording power indicating a power level of the recording power for the second linear velocity v2, Pwb2 represents a second recording power indicating a power level of a second recording power for the second linear velocity v2, Pe1 represents a first erase power level indicating a power level of the erase power for the first linear velocity v1, Pe2 represents a second erase power level indicating a power level of the erase power for the second linear velocity v2, v1<v0<v2, Pwb represents a power level of the second recording power for a linear velocity v of v1<v<v2, and Pe represents a power level of the erase power for the linear velocity v.

20. The optical information recording method according to claim 19, wherein in the recording pulse generation step, a width of each step of the stepwise waveform is set to be longer than ½ of a channel clock cycle for the second linear velocity v2.

21. An optical information recording medium to be used for recording data by the optical information recording method according to claim 19, comprising information recorded thereon that indicates a value of the second recording power level Pwb2.

22. An optical information recording medium to be used for recording data by the optical information recording method according to claim 19, comprising information recorded thereon that indicates a value of the first inter-pulse power level Pbt1.

23. The optical information recording method according to claim 19, wherein data is recorded onto the optical information recording medium using a CAV recording technique.

24. An optical information recording method, wherein a mark or a space having a length corresponding to a length of a data recording code is formed by irradiating a rotating optical information recording medium with laser light to change optical characteristics of a photosensitive recording layer, and the mark is formed by irradiating the rotating optical information recording medium with the laser light with a power being switched among a plurality of power levels including at least a recording power level and an erase power level, the method comprising:
    a linear velocity setting step of setting a first linear velocity v1, which is a lower limit, end a second linear velocity v2, which is an upper limit, with respect to the rotating optical information recording medium,
    a recording pulse generation step of generating a recording pulse signal composed of a recording pulse and/or a recording pulse train, depending on a result of setting by the linear velocity setting portion; and
    a laser drive step of irradiating the optical information recording medium with the laser light based on the recording pulse signal generated by the recording pulse generation portion, wherein duty ratios of the recording pulses are set to be constant when the linear velocity v is v1≦v<v0 and when the linear velocity v is v0<v≦v2, respectively, and the power level Pbt of the inter-pulse is controlled so that (Pbt−Pe) is increased, depending on an increase in the linear velocity v, when the linear velocity v is v1≦v<v0 and when the linear velocity v is v0<v≦v2 respectively, where v0 represents a predetermined linear velocity, where Pbt represents a power level between the recording pulses in the recording pulse train for a linear velocity v of v1<v<v2, Pe represents a power level of the erase power for the linear velocity v, and v1<v0<v2.

25. The optical information recording method according to claim 24, wherein a correction amount of an edge position of the recording pulse is controlled to be constant with reference to a channel clock cycle when the linear velocity v is v1≦v<v0 and when the linear velocity v is v0<v≦v2, respectively, where v0 represents a predetermined linear velocity.

26. An optical information recording medium to be used for recording data by the optical information recording method according to claim 25, comprising information recorded thereon that indicates a value of a correction amount of an edge position of the recording pulse.

27. An optical information recording medium to be used for recording data by the optical information recording method according to claim 24, comprising information recorded thereon that indicates values of the inter-pulse power level Pbt and the duty ratio of the recording pulse.

28. The optical information recording method according to claim 24, wherein data is recorded onto the optical information recording medium using a CAV recording technique.

* * * * *

UNITED STATES PATENT AND TRADEMARK OFFICE
CERTIFICATE OF CORRECTION

PATENT NO.         : 7,116,623 B2
APPLICATION NO. : 10/532946
DATED                : October 3, 2006
INVENTOR(S)       : Narumi et al.

It is certified that error appears in the above-identified patent and that said Letters Patent is hereby corrected as shown below:

Title page, Column 2, Line 4 of the Abstract: "for a optical" should read --for an optical--.
Column 19, line 60(claim 6): "selling" should read --setting--.
Column 20, line 22(claim 6): "liner" should read --linear--.
Column 20, line 26(claim 6): "v1<v<v2" should read --v1<v0<v2--.
Column 20, line 29(claim 6): "liner" should read --linear--.
Column 20, line 45(claim 8): "en" should read --an--.
Column 20, line 50(claim 8): "limit with" should read --limit, with--.
Column 21, line 12(claim 9): "end" should read --and--.
Column 21, line 21(claim 10): "formed irradiating" should read --formed by irradiating--.
Column 22, line 4(claim 12): "more v0" should read --more, v0--.
Column 22, line 48(claim 15): "Pbt1, represents" should read --Pbt1 represents--.
Column 22, line 66(claim 16): "liner" should read --linear--.
Column 23, line 23(claim 19): "a liner velocity setting step of setting a first liner" should read --a linear velocity setting step of setting a first linear--.
Column 24, line 35(claim 24): "end" should read --and--.
Column 24, line 55(claim 24): "v0<v≤v2 respectively," should read --v0<v≤v2, respectively,--.

Signed and Sealed this

Third Day of July, 2007

JON W. DUDAS
*Director of the United States Patent and Trademark Office*